(12) United States Patent
Schlanger

(10) Patent No.: US 7,192,097 B2
(45) Date of Patent: Mar. 20, 2007

(54) VEHICLE WHEEL

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 0 days.

(21) Appl. No.: 10/742,127

(22) Filed: Dec. 19, 2003

(65) Prior Publication Data

US 2004/0130204 A1 Jul. 8, 2004

Related U.S. Application Data

(60) Provisional application No. 60/436,490, filed on Dec. 26, 2002.

(51) Int. Cl.
*B60B 21/06* (2006.01)

(52) U.S. Cl. .......................................... 301/57; 301/59

(58) Field of Classification Search ................ 301/55, 301/57, 59, 61, 104, 105.1, 110.5, 110.6
See application file for complete search history.

(56) References Cited

U.S. PATENT DOCUMENTS

| | | | | |
|---|---|---|---|---|
| 614,670 | A | * | 11/1898 | Stevens et al. ............... 301/56 |
| 934,525 | A | * | 9/1909 | Heartley ..................... 301/57 |
| 4,294,490 | A | * | 10/1981 | Woelfel ................. 301/64.703 |
| 4,529,253 | A | | 7/1985 | Ho |
| 4,585,277 | A | * | 4/1986 | Watanabe .................... 301/56 |
| 4,618,187 | A | | 10/1986 | Watanabe |
| 5,110,190 | A | * | 5/1992 | Johnson ...................... 301/55 |
| 6,238,008 | B1 | * | 5/2001 | Forsythe et al. ............. 301/55 |
| 6,520,595 | B1 | | 2/2003 | Schlanger |
| 6,688,704 | B2 | * | 2/2004 | Meggiolan ............... 301/110.5 |

* cited by examiner

*Primary Examiner*—Jason R. Bellinger

(57) ABSTRACT

An improved wheel construction with a peripheral wheel rim, a central hub with a hub flange and a plurality of spokes extending between the rim and hub, wherein the spokes have a first peripheral portion connected to the rim and a second portion opposed to the first portion. At least one of the spokes is a duplex spoke, including two structural spans extending between the rim and hub with a common portion connected to the hub flange. The duplex spoke includes a portion to directly engage the hub flange.

48 Claims, 22 Drawing Sheets

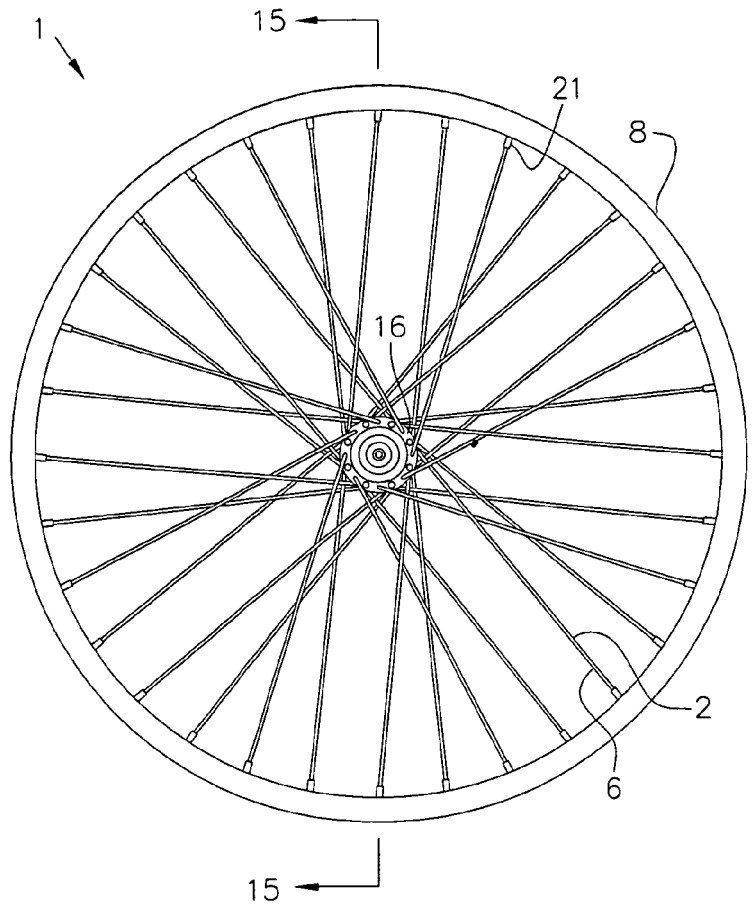
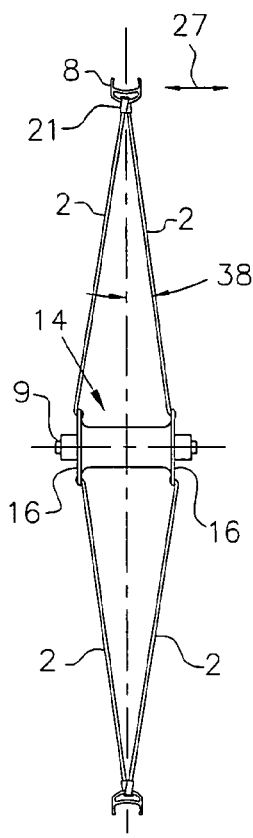
FIG. 2a
Prior Art
FIG. 2b
Prior Art
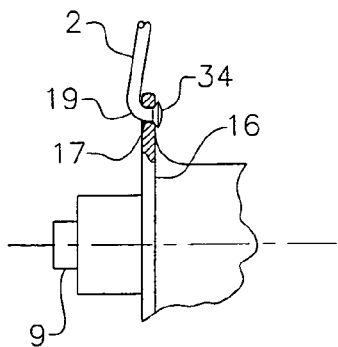
FIG. 2c
Prior Art

VEHICLE WHEEL

CROSS-REFERENCE TO RELATED APPLICATION

This application claims priority of U.S. provisional patent application No. 60/436,490, filed Dec. 26, 2002, and entitled "Vehicle Wheel".

BACKGROUND OF THE INVENTION (1) Field of the Invention

The present invention relates to an improved vehicle wheel construction, particularly bicycle wheels, including an improved connection means for connecting the spokes to the hub.

(2) Description of the Related Art

Heretofore, the vast majority of wheels have been constructed using steel wire spokes that each constitute a single structural span, with their inner end connected to the hub and their outer end connected to the rim. The spokes are generally formed from steel wire and the hub and rim may be of aluminum or steel construction. The hub, rim and individual spokes are each formed as individual components that are then joined together with mechanical connections.

The tensile forces within the spoke create relatively high stresses at their connection points and these connection points must therefore be capable of withstanding these stresses. In the conventional spoke connection arrangement, stresses due to the spoke tension are concentrated over a relatively small region of the hub flange, namely the portion of the hub flange material that is radially outward from the spoke hole. This requires that the hub flange construction be based on expensive, higher strength materials and the use of more expensive forming processes, such as forging, rather than less costly processes, such as die-casting or injection molding. Further, these stresses require that the flange be designed with robust thickness, thus adding weight to the wheel assembly.

The spoke is engaged to the hub flange with edge-to-edge contact between the head and J-bend of the spoke and the spoke hole of the hub flange, resulting in very high contact stresses at these interfaces. It is very common for the hub flange to distort due to the high contact stresses imparted by the spokes. This distortion, along with yielding of the J-bend of the spoke itself, causes the spoke pre-tension to relax somewhat, requiring frequent adjustment to maintain the alignment of the wheel rim.

More recently, in an effort to reduce the weight of the wheel assembly, some high-end wheels have been constructed using fewer spokes, each with a correspondingly higher level of spoke pre-tension. The additional pre-tension only serves to increase the stress at the hub flange connection, further exaggerating the associated problems.

The manufacture of the hub component is an expensive process. Some hub shells are machined from aluminum billet while others are cast or forged and subsequently machined. This machining operation generally requires at least three machining setups: first the cylindrical portions of the hub are turned on lathe, second, the spoke holes in one hub flange are drilled in a rotary index operation, and third, the opposite hub flange is drilled in a separate rotary index operation as well. This multi-step machining process adds considerable expense to the manufacture of the hub shell component.

Due to fabrication methods employed in conventional hub construction, it is very difficult to machine or otherwise create the details required to insure that the geometry of the hub flange conform to the spoke surface without any clearances. Such clearances allow flexure or movement under tensile loading of the spoke. With the constant cycling stress on the spoke due to the rolling of the loaded wheel, this bending flex results in premature failure of the spoke due to fatigue. In fact, the j-bend region is a very common location of the spoke breakage on bicycle wheels. Some spoke manufacturers have attempted to compensate for this shortcoming by thickening the spoke wire in this region, but this solution results in considerable extra expense and weight.

Further, it is common practice for the builder of conventional wheels to manually bend the spokes in an attempt to induce the spoke to partially conform to the hub flange and align the spoke in its direction toward the rim. This is obviously a compromise since, particularly in the case of bicycle wheels, the rim is of relatively light construction and any inconsistency in spoke tension or spoke flexure characteristics will cause the wheel to go out of true, or worse, will cause spoke breakage. When the tensile loads are not evenly shared by all of the spokes, the spokes with greater stresses will be more prone to breakage as will the portions of the rim and hub flange associated with these spokes.

It is often an objective to construct wheels with spokes that are flattened along their length to create a more aerodynamic cross-section profile. With a conventional hub flange, this creates a problem where the extra width of the flattened cross section must pass through the round hole in the hub flange. The common assembly method, when flattened spokes are utilized, requires the slotting or notching of each individual spoke hole in the two hub flanges to allow the spoke to pass through. This additional operation adds considerable expense and weakens the hub flange as well.

Accordingly, it is an objective of the present invention to overcome the forgoing disadvantages and provide an improved vehicle wheel with an improved spoke design and an improved spoke attachment to the hub.

It is a further objective of the present invention to provide a construction as aforesaid which reduces cost and provides a wheel that is light in weight and high in strength and reliability.

Further objects and advantages of the present invention will appear hereinbelow.

SUMMARY OF THE INVENTION

In accordance with the present invention, it has now been found that the forgoing objects and advantages may be readily obtained.

The wheel of the present invention comprises: a peripheral wheel rim, a central hub with an hub flange, and a plurality of spokes extending between the rim and hub, wherein said spokes have a first portion connected to said rim and a second portion opposed to said first portion, wherein at least one of said spokes is a duplex spoke, including two structural spans, each extending between said rim and said hub with a common portion connected to the hub flange. Wherein the at least one duplex spoke includes engagement means to directly engage the hub flange and the hub flange includes engagement means to directly engage the duplex spoke engagement means. Wherein the hub flange engagement means includes means to provide relative slippage control between the hub flange and the duplex spoke engagement means.

The present invention obtains many advantages. One advantage of the present invention is the reduction in cost through the ability to utilize inexpensive and efficient manufacturing techniques in the production of component parts.

The hub and hub flange of the present invention may be produced using 'net shape' molding techniques that reduce or eliminate the need for expensive machining operations. Since this design is well suited to such molding or casting operations, the desired hub geometry may be produced with few, if any, secondary machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

In contrast to the edge-to-edge contact at the connection interface between the spoke and the hub flange of conventional wheels, the present invention may utilize surface-to-surface contact, resulting in a much larger surface area of contact. Since the spoke tension stresses of the present invention are now distributed over a wider area, contact stresses between these two components are greatly reduced. Thus the strength requirements for the hub flange material are reduced and lower performance materials may be utilized, further reducing the cost as compared with conventional hubs. For example, the hub flange of the present invention may now be formed from relatively inexpensive polymer resins. These materials also lend themselves to lower-cost forming operations such as plastic injection molding. If a metallic hub flange is deemed necessary, high strength billet alloys are no longer required. Lower-strength metal casting alloys, which may be formed using a casting process such as die-casting, will likely have sufficient strength.

Since conventional wheels utilize single spokes, the spoke tensile loads carried at connection interface with the hub must be capable of withstanding the full or absolute tension of the spoke. In the duplex spoke of the present invention, the corresponding load carried at the connection interface with the hub by the hub flange is merely the difference in spoke tension force between the two spoke spans. Since the spoke tension force of a tension-spoke wheel is generally balanced and shared by all of the spoke spans of the wheel, this difference in spoke tension force is comparatively quite low and corresponds only to a portion of the external load applied to the bicycle wheel.

This reduction in load at the interface between the spoke and the hub flange allows that the hub flange material be made from a more lightweight and/or less expensive material such as aluminum, magnesium or polymer composite or other material.

The present invention is uniquely applicable to arrangements wherein the hub flange and/or rim are formed from polymeric materials. Many of these materials, especially engineering polymers, exhibit good strength characteristics and are relatively inexpensive and easy to mold. Heretofore, these materials have not been successfully applied in hub flange and rim applications because they do not exhibit sufficient hardness to withstand the high contact stresses associated with conventional spoke attachment technology.

Also, fiber reinforced injection molding compounds may now be utilized in the present invention. With these high strength composite polymers, the injection molding process permits the fibers to attain a generally random orientation within the matrix. This is a significant benefit that would not apply if the hub were machined from a fiber reinforced plastic billet. Fiber reinforced billet is normally produced by an extrusion process where the fibers become highly aligned in the direction of extrusion. Thus, a hub shell machined from such a billet would have relatively low strength perpendicular to the direction of extrusion.

In comparison with the single spoke span of conventional wheels, the present invention utilizes duplex spokes to combine two spoke spans into a single spoke component. These duplex spokes require fewer manufacturing and handling operations and are therefore more economical to produce.

An additional advantage of the present invention is the production of a wheel that is light in weight and high in strength and reliability.

In an effort to enhance the performance of the bicycle, designers have continually aimed toward reducing the weight of its components while maintaining the strength and reliability that the marketplace requires. This is particularly true of the rotating components, such as the wheel, since any weight reduction reduces the rotational inertia as well as the static mass of the bicycle.

Due to its relaxed strength requirements, the present invention permits the use of lightweight materials to produce the hub flange component. Thus, materials such as polymers, reinforced polymers, magnesium, aluminum, among others, may now be used to construct the hub flange, saving precious weight.

Additionally, since the present invention permits the use of net-shape molding operations, the hub flange may now be produced to include far more intricate geometry than would be realistic for a hub that is machined from billet. This allows the designer to eliminate material from the hub flange in the locations where it is not required, further saving precious weight.

The engaged spoke connection of the present invention results in a hub flange that is conformed or matched to the geometry of the spoke to support the connection therebetween. Therefore the spoke tensile loads produce little or no relative movement or squirm between the spoke and the hub flange or rim. The exposed portion of the spoke extends to its connection at the rim in a straight and aligned direction. Without the bending flex and fatigue associated with conventional spokes, the present invention may provide a stronger, more reliable wheel that is less prone to broken or worn components and is far more effective at maintaining trueness and rim alignment.

Due to its duplex spoke design and its reduced stress requirements, the present invention more readily lends itself to the utilization of high-performance synthetic fibers in the construction of the spoke. These fibers are far lighter than the steel used in conventional wheels and may include carbon fibers, aramid fibers, PBO fibers and glass fibers, among others.

The present invention permits the spokes to be replaced, permitting greater serviceability in the field.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2a is an axial plan view illustrating a prior art bicycle wheel;

FIG. 2b is a cross-section view of the prior art bicycle wheel as seen generally in the direction 15—15 of FIG. 2a;

FIG. 2c is a fragmentary view detailing the view illustrated in FIG. 2b where the hub flange is shown in a partial cross-section to illustrate connection with the spoke;

DETAILED DESCRIPTION OF THE INVENTION

Figure 1:
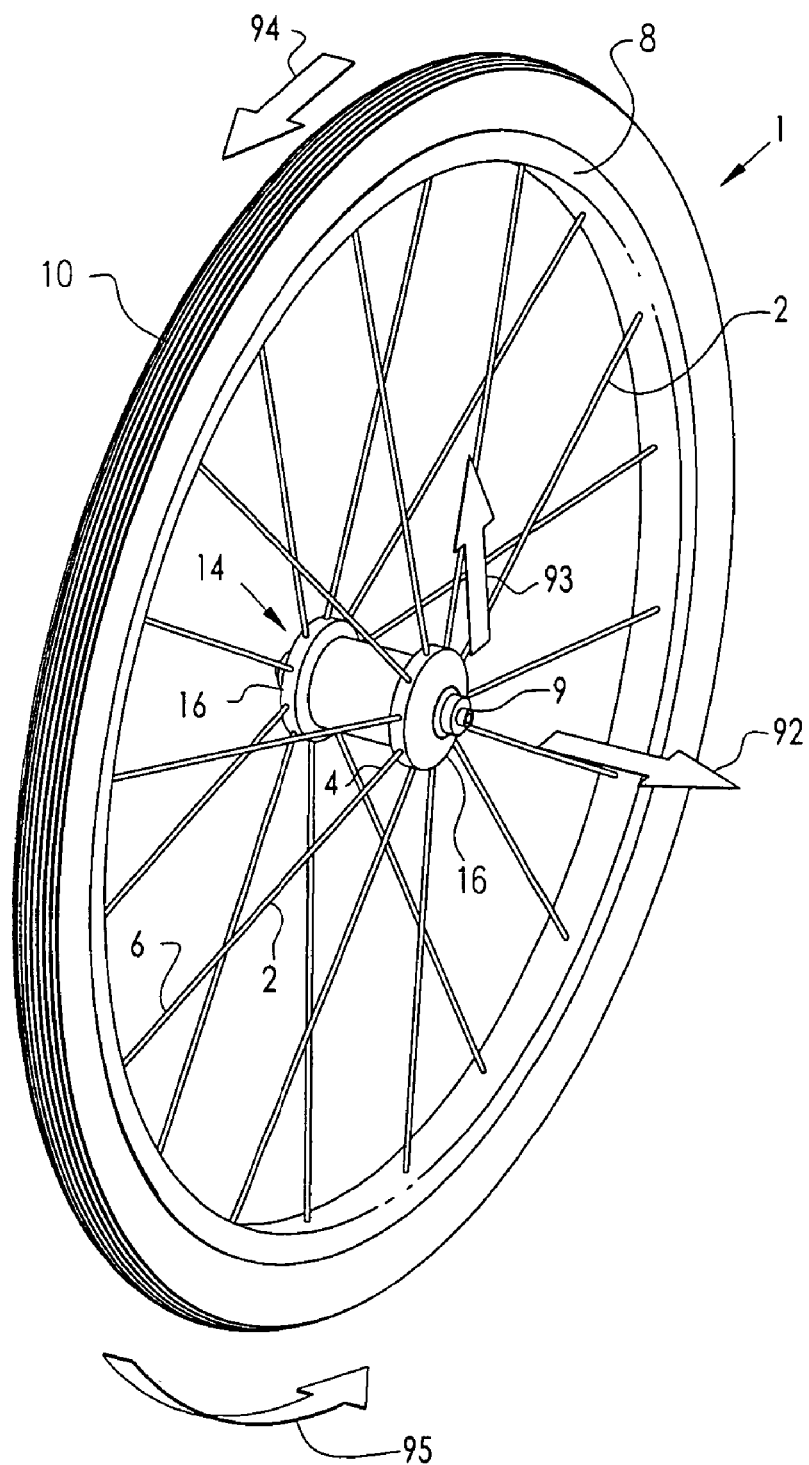
FIG. 1 is a perspective view schematically illustrating the general configuration of a prior art vehicle wheel as applied to a bicycle wheel.

FIG. 1 describes the basic configuration of a vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The hub flange 16 may be contiguous with the hub shell 14 or it may be separately formed and assembled to the body of the hub shell 14. The spokes are affixed to the hub flange 16 at their first end 4 and extend to attach the rim 8 at their second end 6. The tire 10 is fitted to the outer periphery of the rim 8. The axial direction 92 is any direction parallel with the axis of the axle 9. The radial direction 93 is a direction generally perpendicular to the axial direction 92 and extending from the centerline of the axle 9 radially out toward the rim 8. The tangential direction 94 is a direction within a radial plane and perpendicular to a vector in the radial direction 93. The circumferential direction 95 is a cylindrical vector that wraps around the axial direction 92 axis at a given radius. While it is most common for the hub shell 14 to rotate about a fixed axle 9, there are some cases where it is desirable to permit the axle 9 to rotate with the wheel 1 such as the case where the wheel 1 is driven by the axle 9. It should be understood that the term "hub flange" is a conventional term and does not necessarily connote a flanged-shaped portion of the hub shell. Instead, the term "hub flange" merely refers to the portion of the hub shell 14 to which the spoke(s) are connected.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2*b* is bracing angle 38 between the radial centerline plane of the rim 8 and the tensile axis of the spokes 2. As this bracing angle 38 is increased, the lateral 27 stiffness of the wheel is also increased.

Figure 3A:
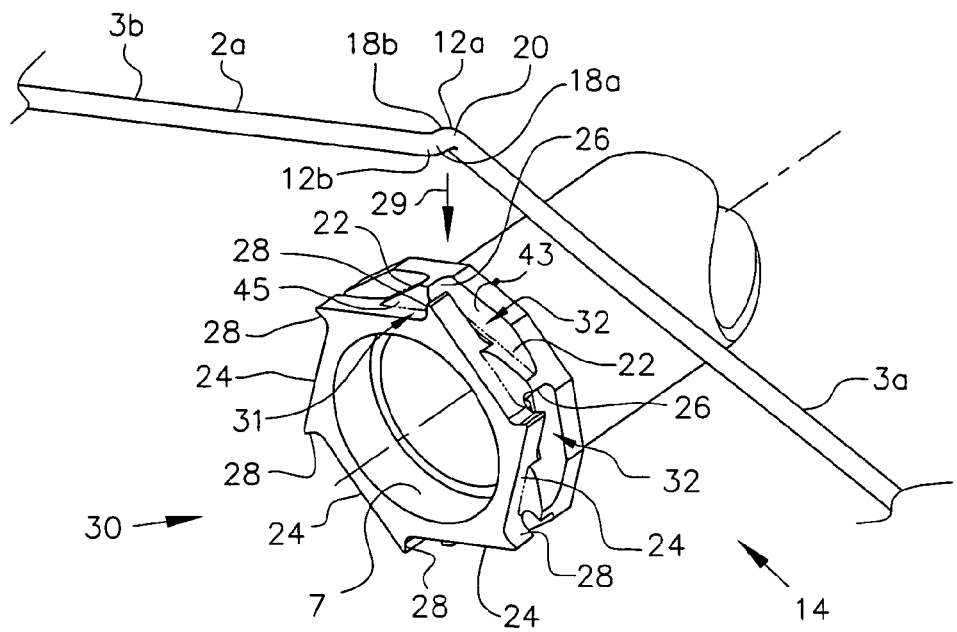
FIG. 3a is a partial perspective view of an embodiment of the present invention showing the spoke and hub flange prior to their assembly.
Figure 3B:
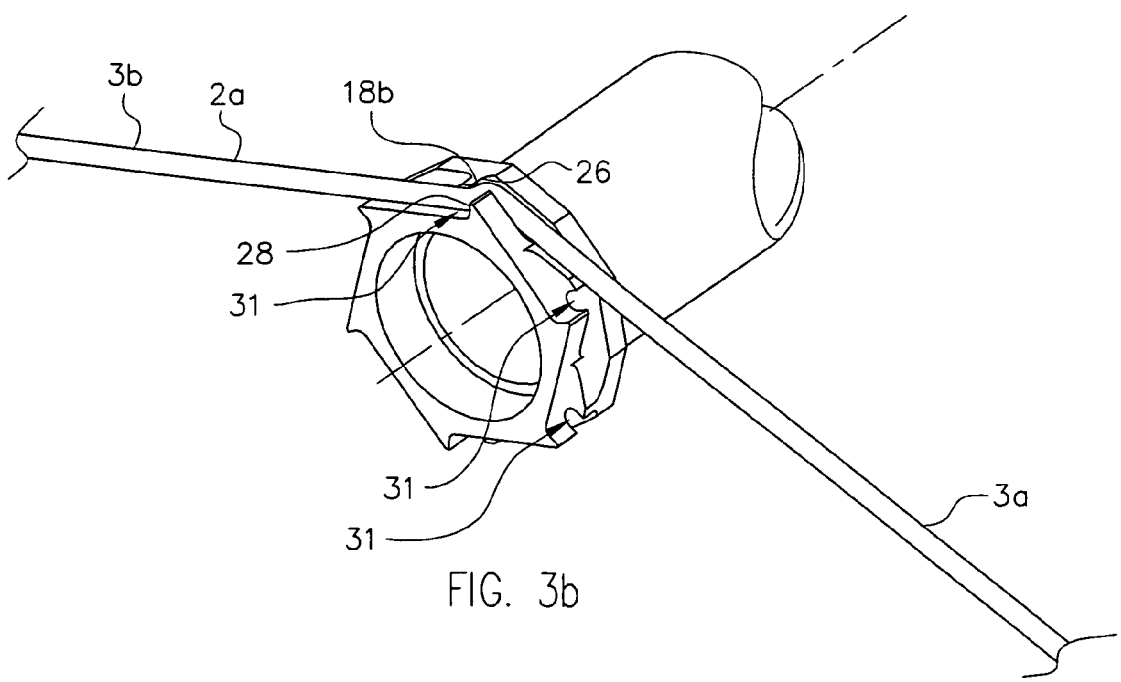
FIG. 3b is a partial perspective view of the embodiment of FIG. 3a, showing one spoke assembled to the hub flange.
Figure 3C:
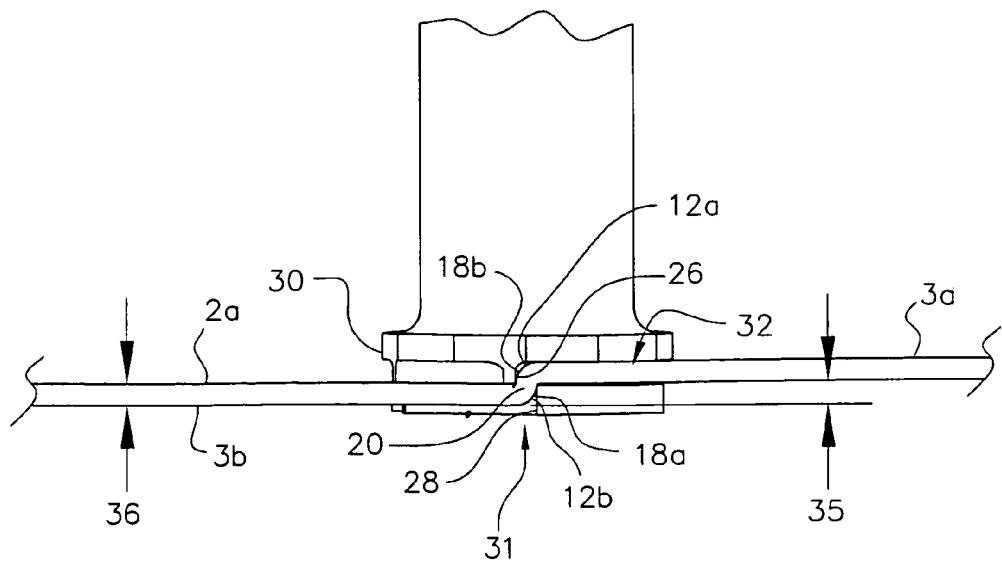
FIG. 3c is a partial radial view of the embodiment of FIG. 3a, showing one spoke assembled to the hub flange, illustrating the offset of the spoke.
Figure 3D:
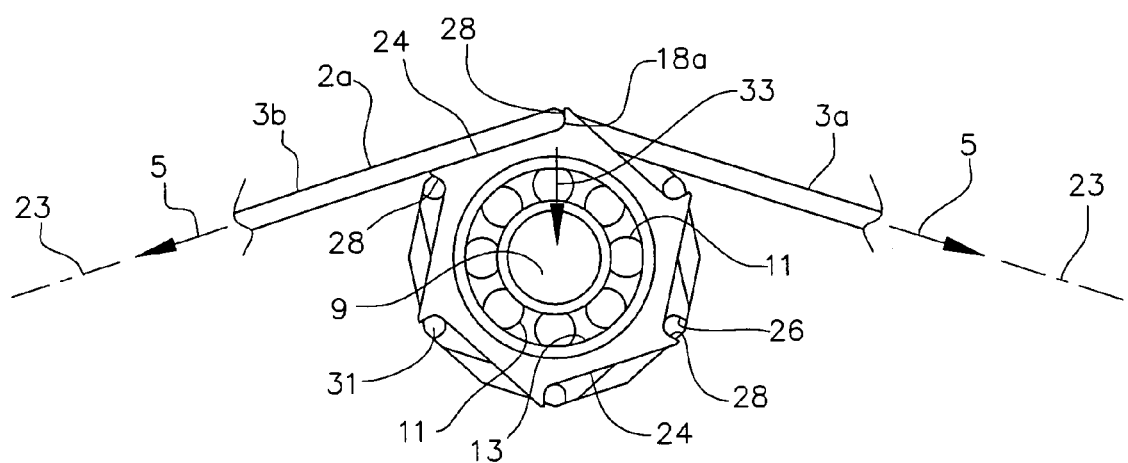
FIG. 3d is a partial axial plan view of the embodiment of FIG. 3a, showing one spoke assembled to the hub flange.
Figure 3E:
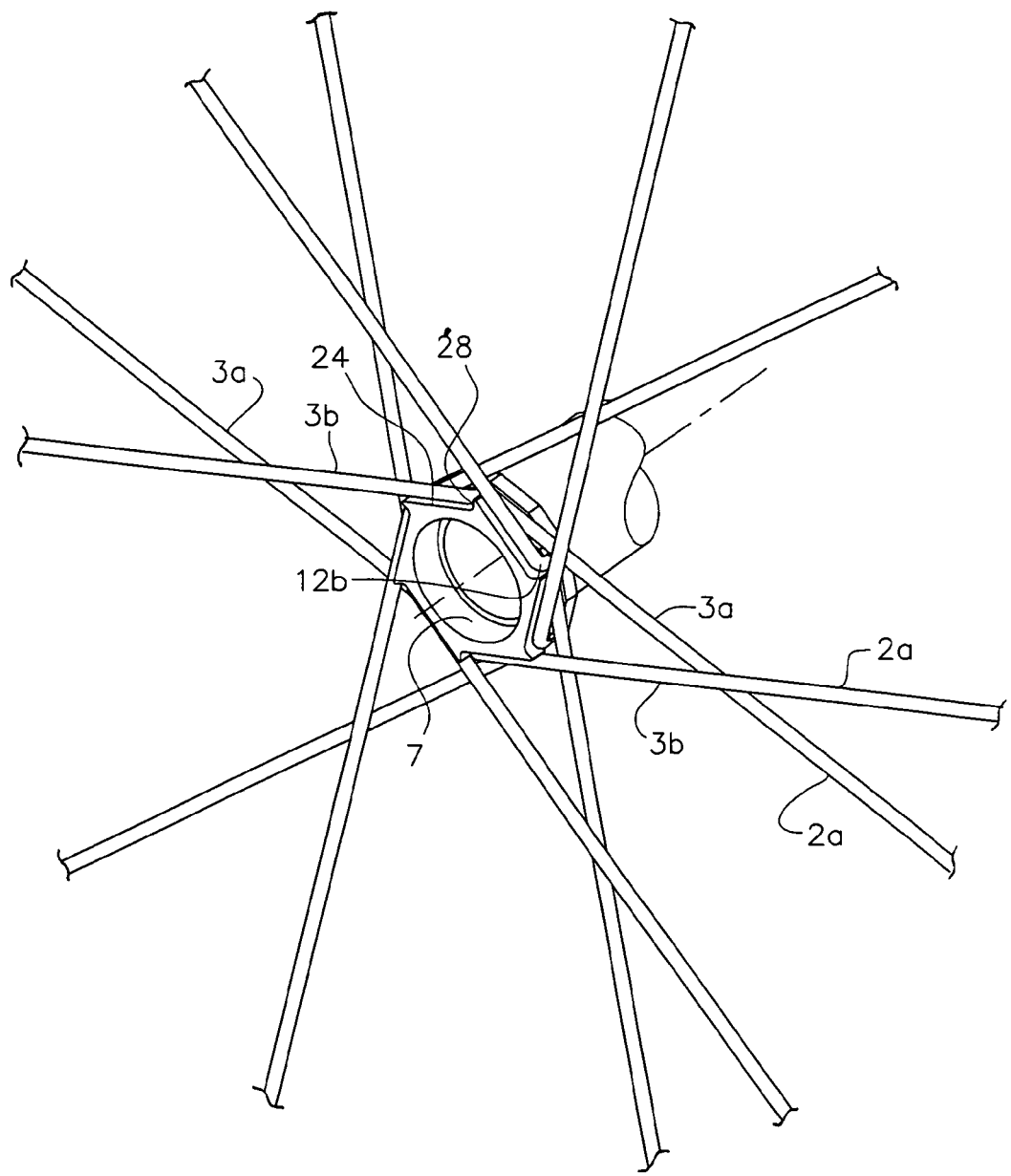
FIG. 3e is a partial perspective view of the embodiment of FIG. 3a, showing several spokes assembled to the hub flange.
Figure 3F:
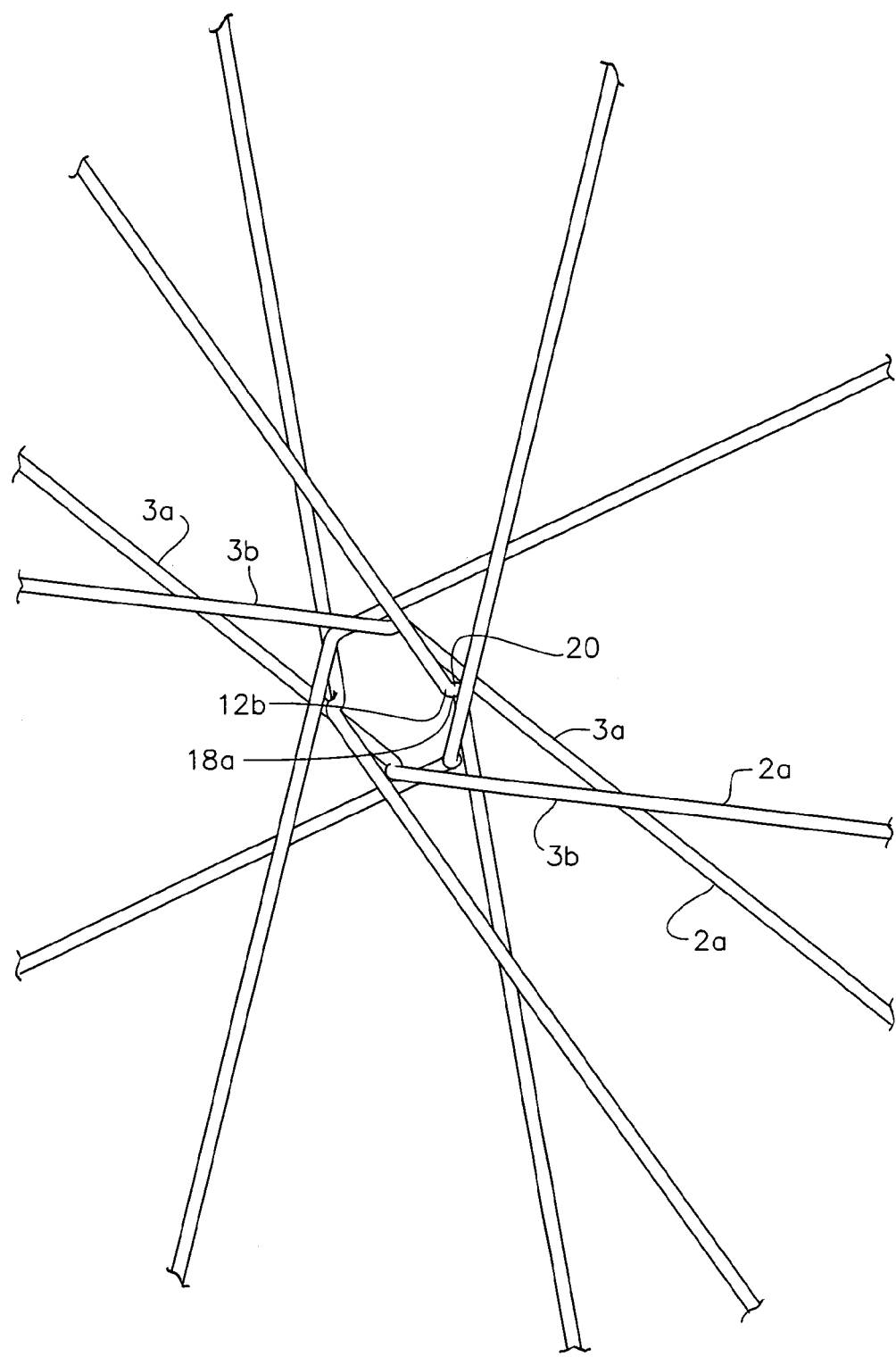
FIG. 3f is a partial perspective view of the embodiment of FIG. 3a, showing the arrangement of the spokes of FIG. 3e, with the hub flange removed for clarity.

FIGS. 3*a*–*g* describe an embodiment where a duplex spoke 2*a* includes an offset kink 20 that engages with the hub flange 30 of hub shell 14. In contrast to a single spoke with only a single structural span, duplex spoke 2*a*, includes two structural spans 3*a* and 3*b* that extend out in a generally radial direction to be connected at their outer ends 6 to the rim 8 in a manner similar to that described in FIG. 2*a*. As shown in FIG. 3*a*, duplex spoke 2*a* includes an offset kink 20 created by two bends 12*a* and 12*b* to create an "S" shape at the central juncture of spans 3*a* and 3*b*. This offset kink 20 serves two functions in this embodiment. First, the offset kink 20 creates an axial offset between the clockwise radiating span 3*a* and the counterclockwise radiating span 3*b*. As shown in FIG. 3*f*, it may be seen that this axial offset permits the clockwise radiating spans 3*a* to cross behind the counterclockwise radiating spans 3*b* without interfering with one another. Second, the bend geometry created by bends 12*a* and 12*b* creates engagement surfaces 18*a* and 18*b* that are generally perpendicular to the tensile axis 23 of their respective spans 3*a* and 3*b*.

Hub shell 14 includes at least two hub flanges 30, with only a single hub flange 30 shown in these figures for clarity. Hub flange 30 includes a series of clockwise tangential recesses 22 to accept spoke spans 3*a* and a series of counterclockwise tangential recesses 24 to accept spoke spans 3*b*. Clockwise tangential recess 22 includes a perpendicular engagement edge 26 and counterclockwise tangential recess 24 includes a perpendicular engagement edge 28. Engagement edges 26 and 28 are axially staggered from each other. It may be seen in FIGS. 3*b*–*d* that, with spoke span 3*a* nestled into recess 22 and spoke span 3*b* nestled into recess 24, engagement surface 18*a* of spoke 2*a* contacts and is engaged with engagement edge 28. Similarly, engagement surface 18*b* of spoke 2*a* contacts and is engaged with engagement edge 26. These simultaneous engagements provide relative slippage control between the spoke 2*a* and the hub shell 14 along the tensile axis 23 of both the clockwise radiating span 3*a* and the counterclockwise radiating span 3*b*. Axial gap 31 exists between axially offset engagement edges 26 and 28 to permit the offset kink 20 of spoke 2*a* to pass therebetween. Thus driving torque may be transmitted from the hub 14 to the spoke 2*a* in either direction of rotation. Hub flange 30 is shown here to include geometry to adapt several spokes 2*a* in the manner previously described.

As noted in FIG. 2*b*, the hub flange is axially spaced outboard relative to the spoke connection at the rim, creating a bracing angle 38 of the spoke span. Due to this bracing angle 38, the spoke tension force applies an axially inboard component of force at its connection the hub flange. In FIG. 3*a*, recess 22 includes bracing surface 45 that extends in a generally radial direction and recess 24 includes bracing surface 43 that also extends in a generally radial direction. It may be seen in FIG. 3*b* that bracing surface 43 supports spoke span 3*a* and bracing surface 45 supports spoke span 3*b* to resist this axially inboard component of the spoke tension force.

With the full complement of spokes 2*a* installed in hub flange 30, as shown in FIG. 3*e*, it may be seen how this relative slippage control serves to provide a solid coupled connection between the spokes 2*a* and the hub flange 30. This connection serves to provide bracing against spoke tension and to transmit rotational torque between the hub flange 30 and the spokes 2*a*. FIG. 3*f* shows the spokes of FIG. 3*e* with the hub flange removed to illustrate how the clockwise radiating spans 3*a* of spokes 2*a* are axially offset from the counterclockwise radiating spans 3*b*. This axial offset permits spans 3*a* and 3*b* to cross past each other as they extend toward their connection at the rim 8.

Depending on the geometry of the offset kink 20 and the level of spoke tension force 5, the bends 12 of spoke kink 20 may flex and straighten slightly due to the applied spoke tension force 5. This flexure may have the additional benefit of straightening the kink 20 slightly, insuring that the engagement surfaces 18*a* and 18*b* of spoke 2*a* will be pressed against their mating engagement edges 26 and 28 to eliminate any tangential free-play or looseness between the spoke 2*a* and the hub flange 30. Hub flange 30 also includes a bearing bore 7 to accept the outer race 13 of an anti-friction bearing 11 so that the hub shell 14 may rotate relative to the axle 9.

The axial hole 17 of FIG. 2*c*, which has closed sides and two open ends, constitutes a closed cavity that surrounds the cross-section of the spoke 2. Thus, in FIGS. 2*a*–*c*, the spoke 2 is assembled to the hub flange 16 by threading the spoke 2 through the hole 17 in an axial direction along the lengthwise centerline of the spoke. In comparison, the combination of recess 22, recess 24 and gap 31 serve to create an open cavity 32 or nest with an open portion along at least one of its sidewalls. This open cavity 32 does not completely surround the cross-section of the spoke, but instead permits the spoke 2*a* to be assembled to the hub flange 30 through the open sidewall in a direction that is generally perpendicular to the lengthwise centerline of the spoke 2*a*. Open cavity 32 also includes two open ends, with span 3*a* extending through a first open end and span 3*b* extending through a second open end. Thus, it may be seen in FIGS. 3*a* and 3*b* that the spoke 2*a* is assembled to the hub flange 30 in a generally radial direction 29. This makes for easier assembly between the spoke 2*a* and the hub flange 30. This is especially advantageous in a duplex spoke 2*a* application, where the spoke 2*a* is generally twice as long as the spoke 2 of FIGS. 2*a*–*c* and may otherwise be prone to tangling with adjacent spokes or with the spokes of the opposing hub flange.

This open cavity 32 design also permits a more complex spoke geometry, such as the offset kink 20, to be engaged with the hub flange 30. Further, the amount of offset 35 of the offset kink 20, as shown in FIG. 3*c*, is preferred to be generally equal to the cross-sectional thickness 36 of the spoke 2*a*. Firstly, this serves to minimize the offset and the associated bending moment on the spoke kink 20 caused by the spoke tension force 5. Secondly, this serves to keep the axial distance of both spans 3*a* and 3*b* of the spoke 2*a* as far axially outboard as possible in the region where it joins to the hub flange 30, serving to provide the greatest bracing angle 38 possible to both spans 3*a* and 3*b*. Overall geometry constraints by external elements, such as the bicycle frame (not shown) generally limit the outer envelope of the geometry of the bicycle wheel 1. It would be difficult, if not impossible to thread such a spoke kink 20 through a closed cavity. Also, it should be noted that the axial stagger of engagement surfaces 26 and 28 provide the requisite clearance for such a minimized offset 35.

It may be seen in FIG. 3d that, spoke tension force 5 along the tensile axis 23 of their relative spoke spans 3a and 3b creates a resultant force 33 that acts in a radially inward direction. This resultant force 33 serves to press the spoke 2a into its mating recesses 24 and 22 of the hub flange 30, thereby eliminating the possibility that the spoke 2a may inadvertently move radially outward and become disengaged from the hub flange 30. Further, with the bearing assembly 11 located in the bearing bore 7, outer race 13 may provide radial compressive strength reinforcement to the hub flange 30 to resist these radially inboard resultant forces. Since the outer race 13 of the bearing 9 is usually made of hardened steel and is of strong and stiff construction, it is very effective as a reinforcement element in this function. With reinforcement provided by the outer bearing race 13, the hub flange 30 may then be made from a more lightweight material such as aluminum, magnesium or polymer composite or other materials that may not necessarily have the high stiffness properties that would be required if the outer bearing race 13 were not in place. Although unreinforced polymer material may be utilized, a polymer composite material, which includes a polymer matrix with reinforcement fibers, is preferred due to its greater strength and stiffness.

In comparison with the single spoke 2 of FIGS. 2a–c, a duplex spoke 2a has several distinct advantages. With the single spoke 2 terminated at the hub flange 30, the full tensile load 5 borne by the spoke must be resisted by the connection between the hub flange 30 and the spoke 2. This load puts tremendous stress on the hub flange 30 and it is not uncommon to see the spoke holes 17 being deformed by this spoke tension force 5. In contrast, the duplex spoke 2a carries the spoke tension force 5 across the full diameter of the rim 8. Now, the corresponding load carried by the hub flange 30 is the difference in spoke tension force 5 between spans 3a and 3b. Since the spoke tension force 5 of a tension-spoke wheel is generally balanced and shared by all of the spoke spans of the wheel, this difference in spoke tension force 5 is comparatively quite low and corresponds only to the external load applied to the bicycle wheel 1. This reduction in load at the interface between the spoke 2a and the hub flange 30 allows that the hub flange 30 material be made from a more lightweight and/or less expensive material such as aluminum, magnesium or polymer composite or other material. Further, a duplex spoke is often less expensive to manufacture because the single duplex spoke component takes the place of two single-spoke components.

The spoke 2a may also be constructed of a variety of materials, depending on its design. The most common material used in spoke construction is continuous steel wire, a material used for bicycle spokes for over a century. Some alternative metallic wire materials that are of lighter weight and these include high-strength aluminum and titanium. Metallic wire may be readily bent to create the spoke kink 20 illustrated here. In addition, there are several new high-strength fibers, such as carbon and aramid fibers, among others, that may be utilized in the construction of these spokes. These fibers may be continuous and span the full length of the spoke or they may be discontinuous and be merely overlapped to be aligned along the length of the spoke. These fibers may be dry fibers without resin impregnation or they may be impregnated with thermoplastic or thermoset matrix resin. For impregnated fiber-reinforced spokes, one preferred method of construction is the pultrusion process where continuous fiber is impregnated with polymer resin. Resin impregnated fiber-reinforced spokes may be formed or molded to create the offset kink 20 geometry shown here. The considered utilization of spokes of fiber-reinforced construction can yield a bicycle wheel structure that is exceptionally light in weight and with excellent vibration-damping characteristics. The use of thermoplastic matrix resin is preferred over thermoset matrix resin due to its ability to be formed subsequent to pultrusion and due to its greater toughness.

Further, FIG. 3a describes a spoke 2a that is formed from a long element with relatively constant cross-section, such as metal wire or fiber-composite pultrusion. The wire is then bent and formed into the kink 20 shown without significantly disrupting the original cross-section of the wire. It is also envisioned that the spoke may be deformed in the kink 20 region so that the cross-section of the wire is mashed, expanded, reduced or otherwise distorted in the region where it engages with the hub flange 30 to provide geometry for a more positively interlocked engagement with the hub flange 30. As is known in industry, there exist many possible methods that may be employed to create such a deformed region in the spoke.

Figure 3G:
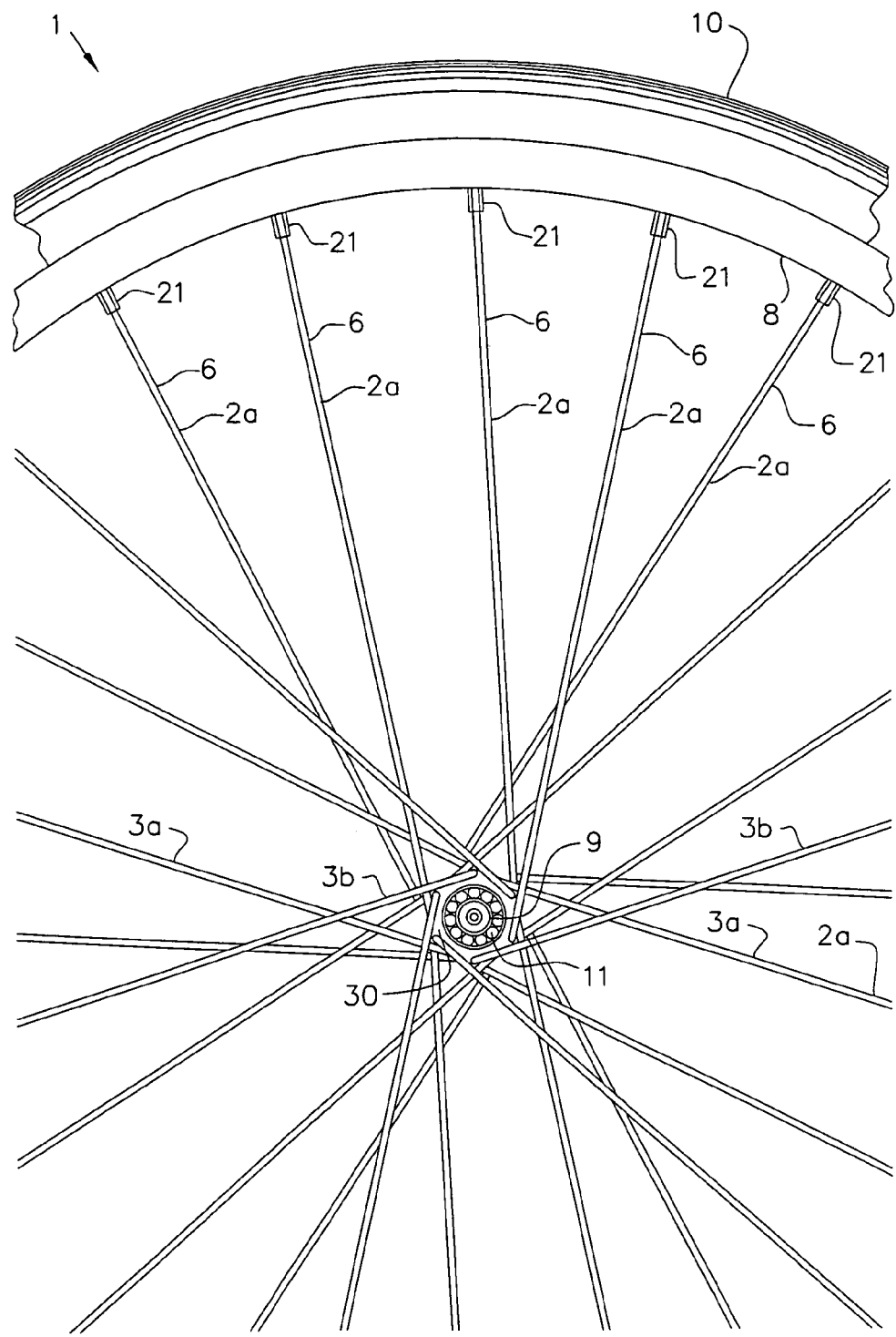
FIG. 3g is a partial axial plan view of the embodiment of FIG. 3a, including the bearings, axle and tire.

FIG. 3g shows the completed bicycle wheel 1 assembly, including the bearing assembly 11 and axle 9. It can be seen that the spokes 2a are connected at their outer ends 6 to the rim 8 by means of conventional spoke nipples 21. Spoke nipples 21 are threadably engaged with outer ends 6 and are engaged with rim 8 such that the threadable engagement may be adjusted to vary the length of the spoke spans 3a and 3b and thereby adjust the pre-tension of the spoke in the conventional manner. Tire 10 is mounted to the rim 8 in the conventional manner.

Figure 4A:
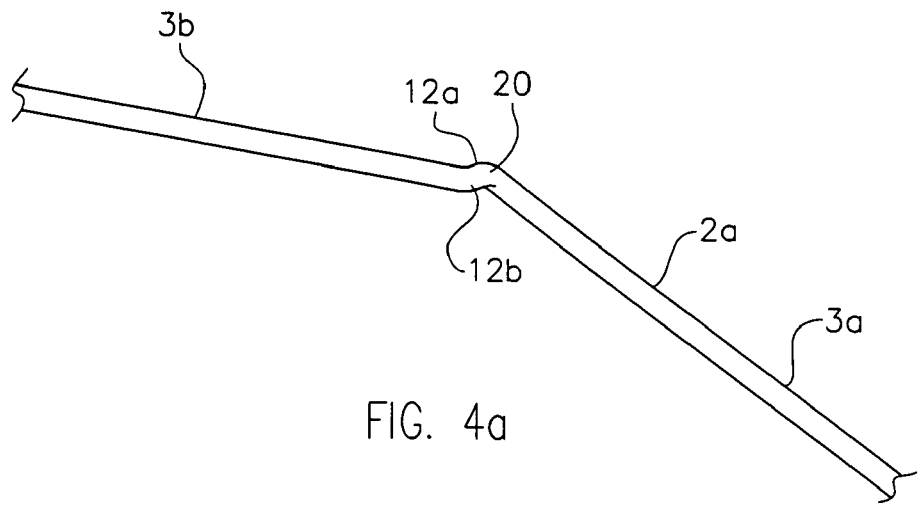
FIG. 4a is a partial perspective view of an embodiment of the present invention showing the spoke prior to overmolding of the slug.
Figure 4B:
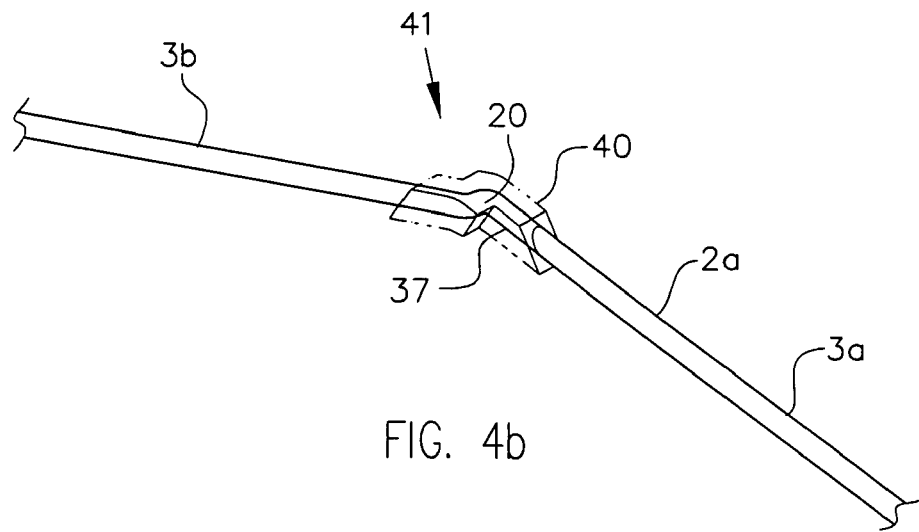
FIG. 4b is a partial perspective view of the embodiment of FIG. 4a, showing the spoke with the overmolded slug in phantom.
Figure 4C:
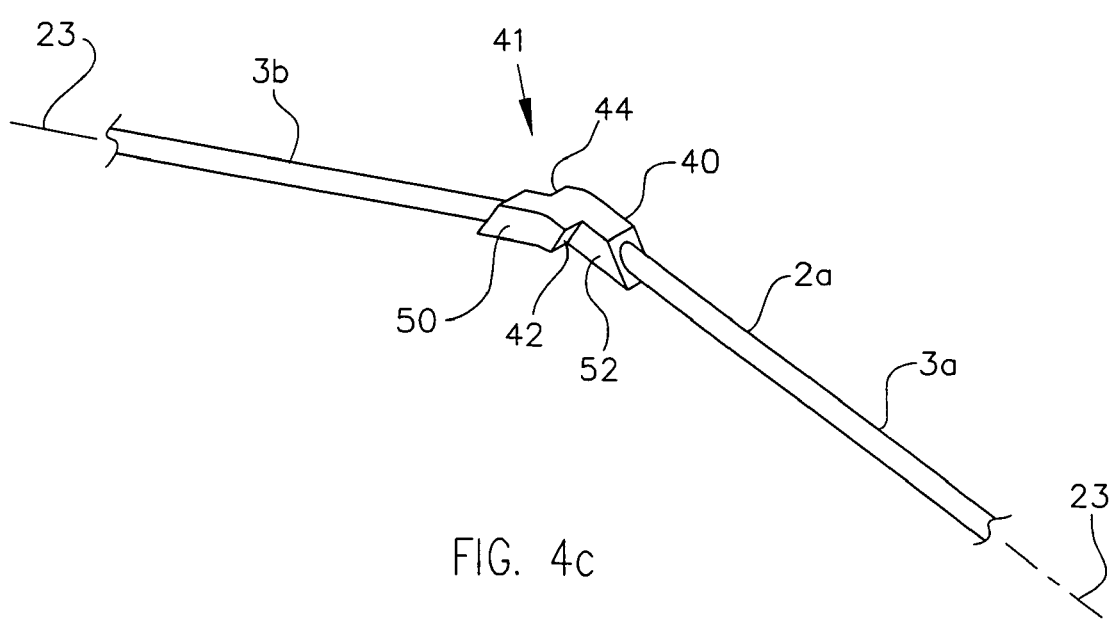
FIG. 4c is a partial perspective view of the embodiment of FIG. 4a, showing the spoke with the overmolded slug.

FIGS. 4a–f describe another embodiment of the present invention where the duplex spoke 2a of FIG. 3a, shown again in FIG. 4a, includes an overmolded slug 40 in the region of the offset kink 20, as shown in FIG. 4b, to create a spoke subassembly 41. Overmolded slug 40 is of castable material that is cast around the spoke 2a in a mold such that, upon hardening, the overmolded slug 40 encapsulates and conforms to the surfaces of the spoke 2a in the encapsulated region 37. The overmolded slug 40 is fixed to the spoke 2a and may now support and reinforce the spoke kink 20 to minimize or prevent any unwanted flexure of the spoke kink 20 due to spoke tension force 5. Depending on the materials chosen for the spoke 2a and the slug 40 material, the slug 40 may be solidly joined to the spoke 2a by one or more of several means, including: mechanical engagement, frictional engagement, surface adhesion, welded adhesion, etc. Adding knurling, threading, or otherwise providing a configured surface to the encapsulated region 37 of the spoke, prior to casting of the slug 40 material, may be utilized to augment this mechanical engagement. Similarly, surface preparations known in industry may be applied to the spoke 2a prior to casting of the overmolded slug 40, which may also augment this adhesion. In the case of a metallic spoke 2a, the overmolded slug 40 may be cast of metallic material, such as aluminum, magnesium or zinc die casting. In the case of metallic or fiber spoke 2a materials, the overmolded slug 40 may be injection-molded out of polymeric resin. It is preferable that this polymeric resin includes reinforcement fibers to impart additional strength and stiffness to the overmolded slug 40.

Figure 4D:
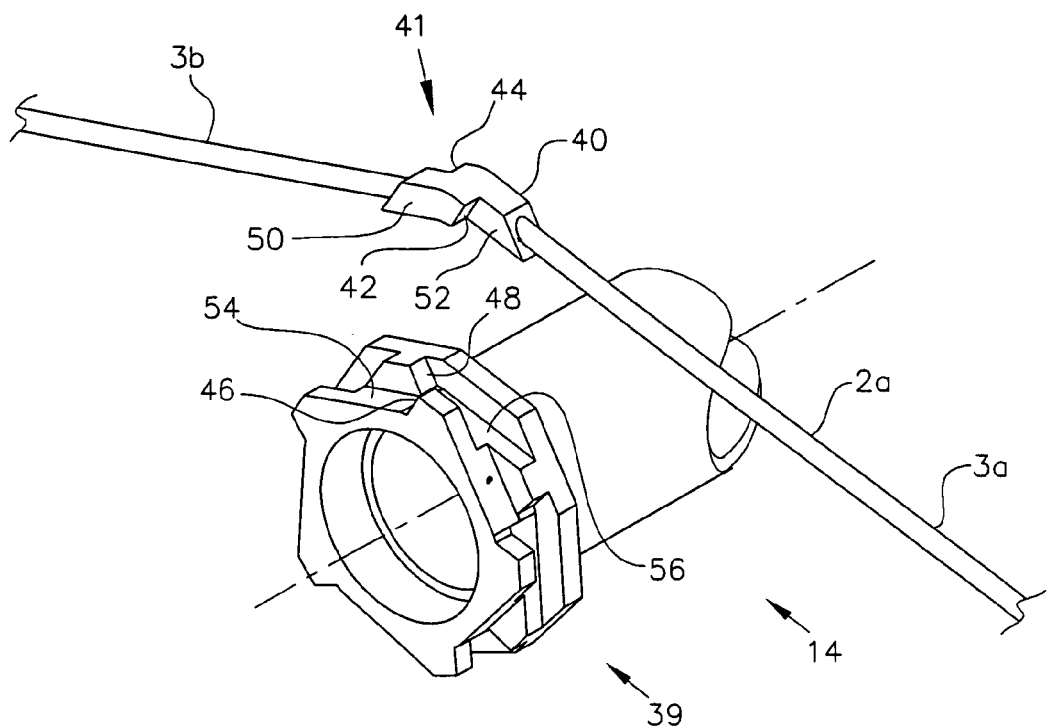
FIG. 4d is a partial perspective view of the embodiment of FIG. 4a, showing the spoke and hub flange prior to their assembly.
Figure 4E:
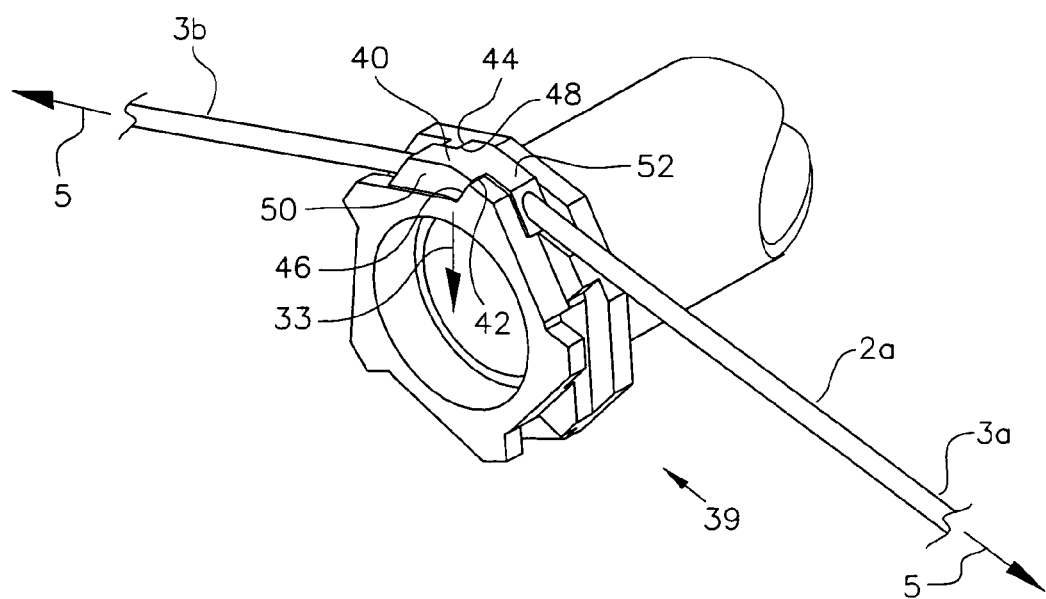
FIG. 4e is a partial perspective view of the embodiment of FIG. 4a, showing one spoke assembled to the hub flange.
Figure 4F:
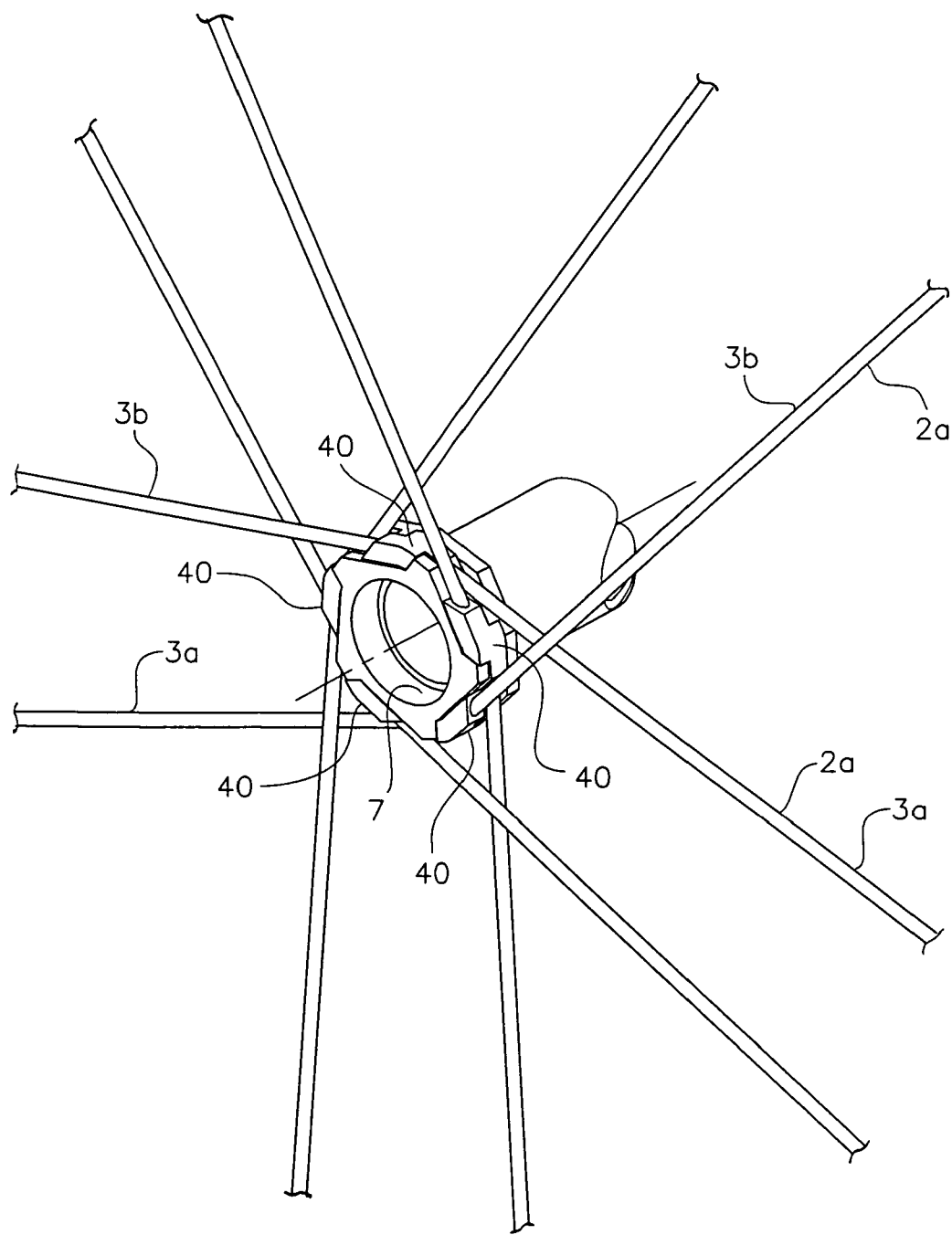
FIG. 4f is a partial perspective view of the embodiment of FIG. 4a, showing several spokes assembled to the hub flange.

Further, since the overmolded slug 40 is cast in a mold, its external geometry may be designed to include edges and features that will optimize the engagement between the slug 40 and the hub flange 39, as shown in FIGS. 4d–f. The overmolded slug may be considered as an extension of the spoke 2a of FIGS. 3a–g, thereby providing a region of variable cross-section to the spoke 2a to facilitate engagement with the hub flange 39. Thus, it may be seen in FIG. 4c that the slug 40 includes angled engagement surface 42 and angled engagement surface 44 that are generally orthogonal to the tensile axis 23 of spans 3a and 3b. Engagement surfaces 42 and 44 correspond roughly to engagement surfaces 18a and 18b of FIG. 3a, but instead are much more clearly defined to provide a more positive engagement with the hub flange 39. Slug 40 also includes extension 52 that extends along spoke span 3a and extension 50 that extends along spoke span 3b.

It may be seen in FIG. 4d that hub flange 39 includes angled engagement surfaces 46 and 48 that correspond roughly to engagement edges 28 and 26, respectively, of FIG. 3a. Thus, angled engagement surface 46 provides a matched blocking surface engagement with engagement surface 42 and angled engagement surface 48 provides a matched blocking surface engagement with engagement surface 44. Hub flange 39 also includes open groove 54 that mates with extension 50 of slug 40 and open groove 56 that mates with extension 52. It should be noted that engagement surfaces 42 and 44 of the slug 40 are axially spaced from each other. Similarly, a multiplicity of axially staggered engagement surfaces 46 and 48 are also distributed around the perimeter of the hub flange 39 to accept a multiplicity of spoke subassemblies 41.

The overmolded slug 40 serves as a secondary element that is fixed to the spoke and provides engagement geometry to the spoke to create an interlocking engagement with the hub flange. As an alternative to casting an overmolded slug onto the spoke 2a, there exists a wide range of methods to fix a secondary element to the spoke to achieve a similar engagement. For example, the secondary element may be a pre-formed sleeve that is crimped or swaged around the spoke to create the engagement geometry. Further, the secondary element may be threadably engaged or adhesively bonded or welded to the spoke. Still further, additional material may be deposited on the spoke surface by a process such as the welding of filler metal.

FIG. 4e shows the spoke 2a and the slug 40 assembled and engaged with the hub flange 39. Angled engagement surfaces 42 and 44 of the slug 40 are mated to the corresponding engagement surfaces 46 and 48 of the hub flange 39. Likewise, extensions 50 and 52 of the slug 40 are nested in their corresponding open grooves 54 and 56 of the hub flange 39. The angled engagement surface 46 is angled with respect to the radial plane and the angled engagement surface 48 is angled oppositely to the radial plane, as shown, to produce a radially inwardly tapered pair of surfaces. Since spoke tension force 5 produces a resultant force 33 that acts in a radially inward direction, the angled engagement surfaces 42 and 44 of the slug 40 are pressed to wedge against the mating tapered angled engagement surfaces 46 and 48 of the hub flange 39. This wedging eliminates any clearance or slop between these mated engagement surfaces and insures a solid engagement between the slug 40 and the hub flange 39. FIG. 4f shows the full complement of spokes 2a, including slugs 40, joined to the hub flange 40. It may be seen that the clockwise radiating spans 3a are axially offset from counterclockwise radiating spans 3b to provide clearance for these spans to cross past each other.

Figure 5A:
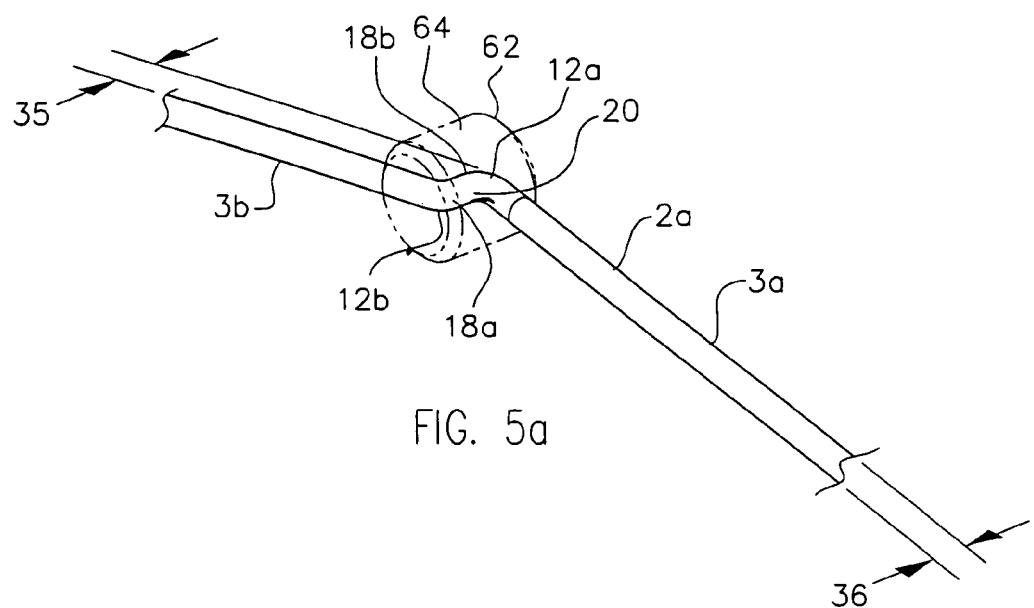
FIG. 5a is a partial perspective view of a spoke of an embodiment of the present invention showing the overmolded slug in phantom.
Figure 5B:
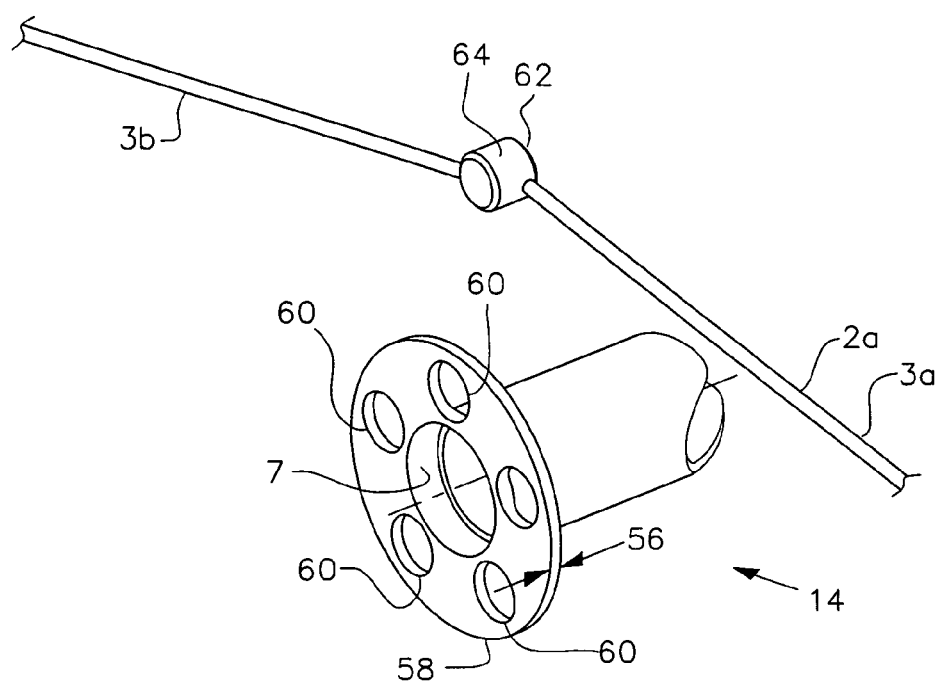
FIG. 5b is a partial perspective view of an embodiment of the present invention showing the spoke and hub flange prior to their assembly.

FIGS. 5a–f describe an embodiment that utilizes a more conventional hub flange 58 that includes axial holes 60 to accept spokes 2a. Axial holes 60 may be interpreted as closed cavities with closed sides and two open ends. As shown in FIG. 5a, duplex spoke 2a includes spans 3a and 3b with an offset kink 20 at their juncture, similar to as previously described in FIG. 3a. Spoke 2a also includes overmolded slug 62, which is generally cylindrical in shape with its circular perimeter 64 corresponding to axial holes 60 of hub flange 58. As shown in FIG. 5b, hub flange 58 is a radially extending flange with axial holes 60 to accept overmolded slug 62. The hub flange 58 is a radial hub flange and does not have the staggered engagement surfaces described in previous embodiments. Since the spoke spans 3a and 3b must straddle the thickness 56 of the hub flange 58, the amount of offset 35 of the offset kink 20 must be increased to include at least one spoke thickness 36 plus the thickness 56 of the hub flange 58.

Figure 5C:
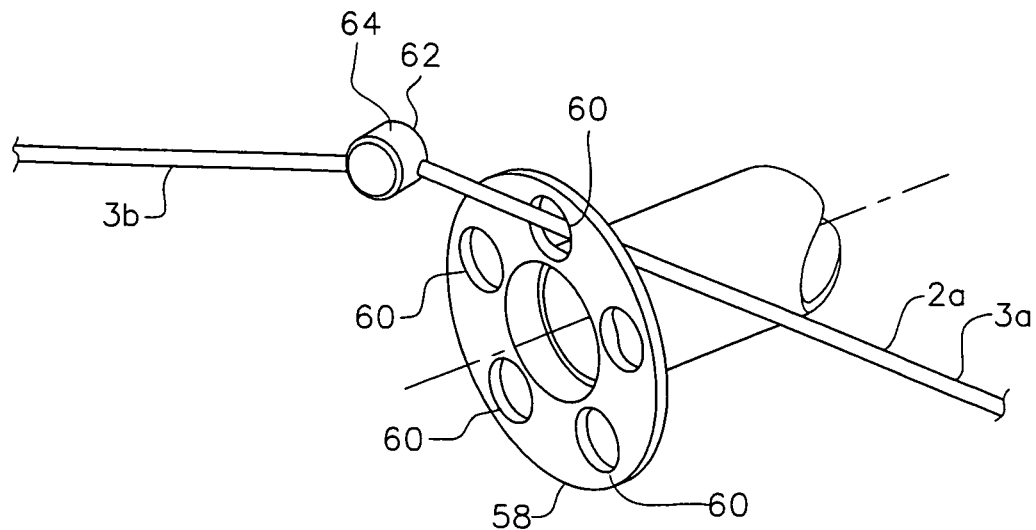
FIG. 5c is a partial perspective view of the embodiment of FIG. 5a, showing one spoke as it is being assembled to the hub flange.
Figure 5D:
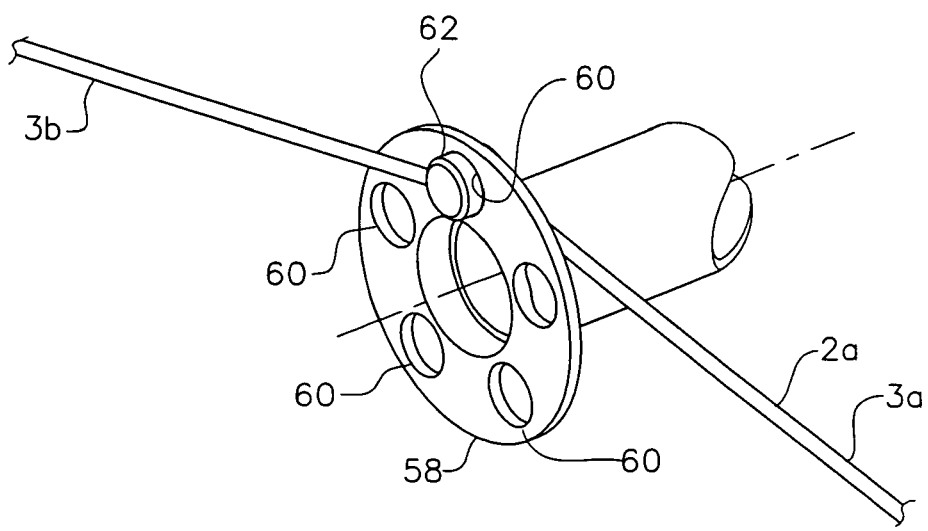
FIG. 5d is a partial perspective view of the embodiment of FIG. 5a, showing one spoke assembled to the hub flange.
Figure 5E:
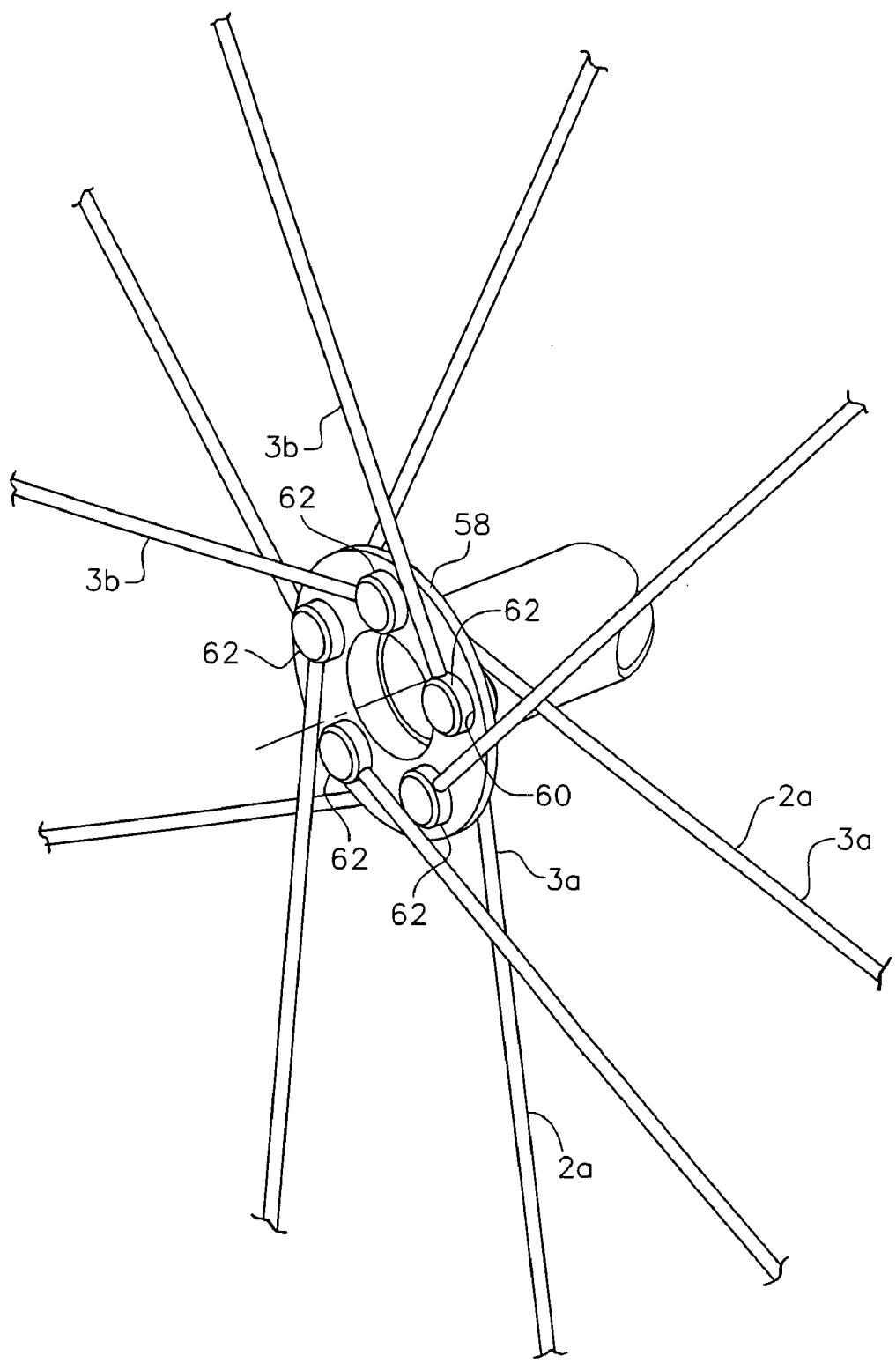
FIG. 5e is a partial perspective view of the embodiment of FIG. 5a, showing several spokes assembled to the hub flange.
Figure 5F:
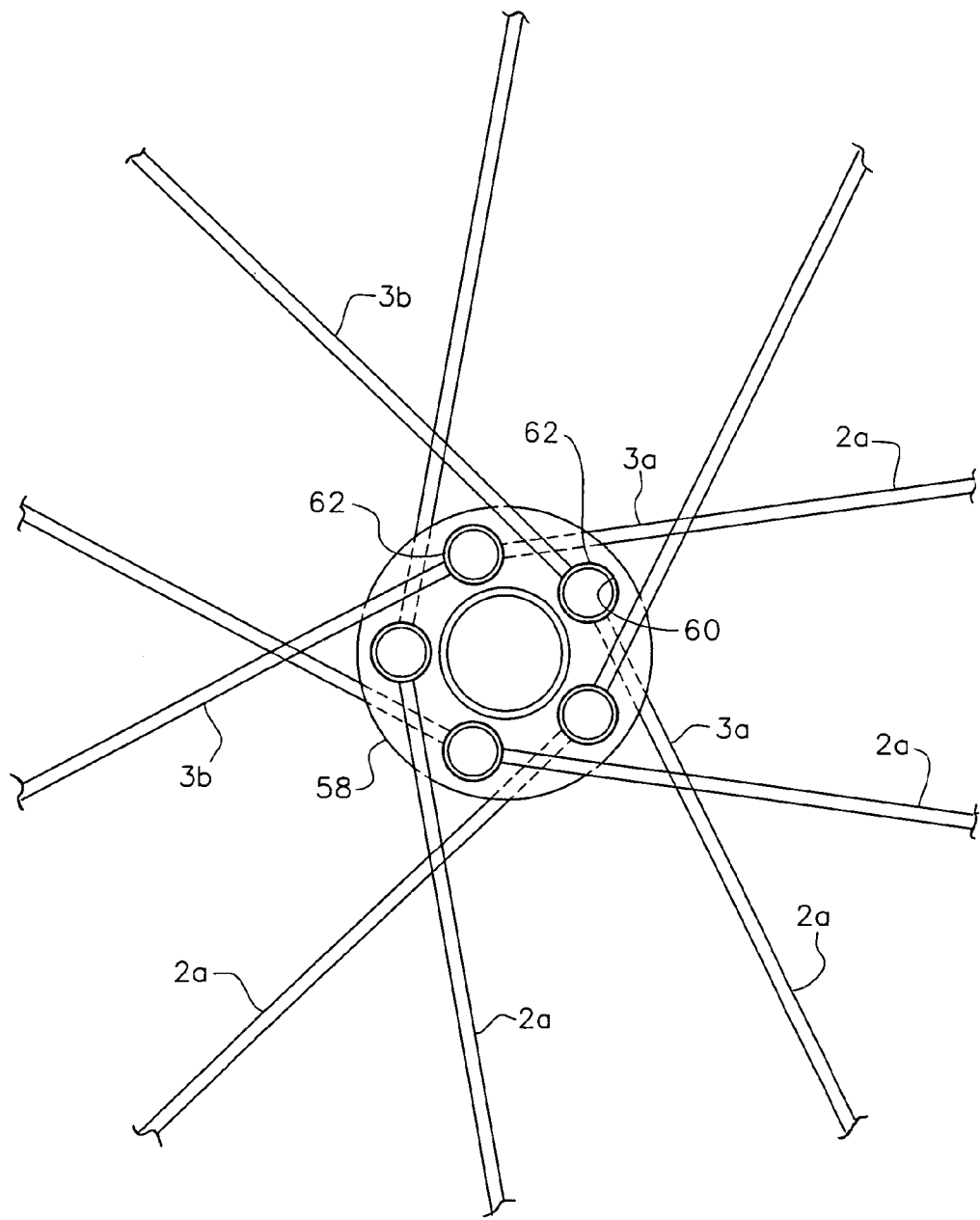
FIG. 5f is an axial plan view corresponding to FIG. 5e.

As shown in FIG. 5c, spoke 2a is assembled to the hub flange 58 by threading it through hole 60 as shown. Since the diameter of hole 60 is much larger than the cross section of spoke span 3a, there is much greater clearance between the two and the spoke 2a may be assembled to the hub flange 58 in a somewhat tangential direction as shown. FIG. 5d shows the spoke 2a assembled to the hub flange 58, with the circular perimeter 64 of slug 62 located within hole 60. FIGS. 5e and 5f show the full complement of spokes 2a, including slugs 62 joined to the hub flange 58.

Figure 6A:
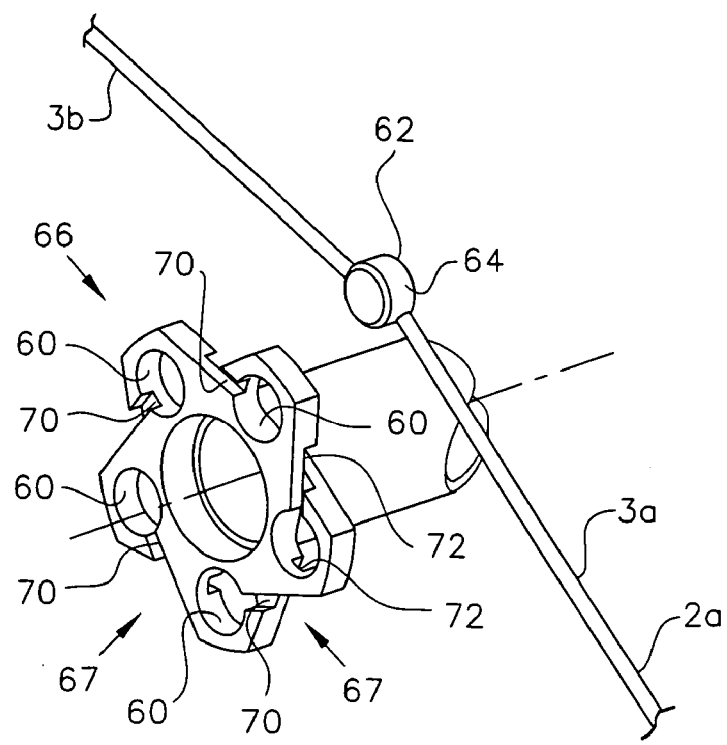
FIG. 6a is a partial perspective view of an embodiment of the present invention showing the spoke and hub flange prior to their assembly.

FIGS. 6a–d describe an embodiment where the hub flange 66 includes axial holes 60 to accept overmolded slug 62 of spoke 2a in a manner similar to the embodiment described in FIGS. 5a–f. As shown in FIG. 6a, duplex spoke 2a includes spans 3a and 3b similar to previously described in FIGS. 5a–f. Spoke 2a also includes overmolded slug 62, which is generally cylindrical in shape with its circular perimeter 64 corresponding to axial holes 60.

Figure 6B:
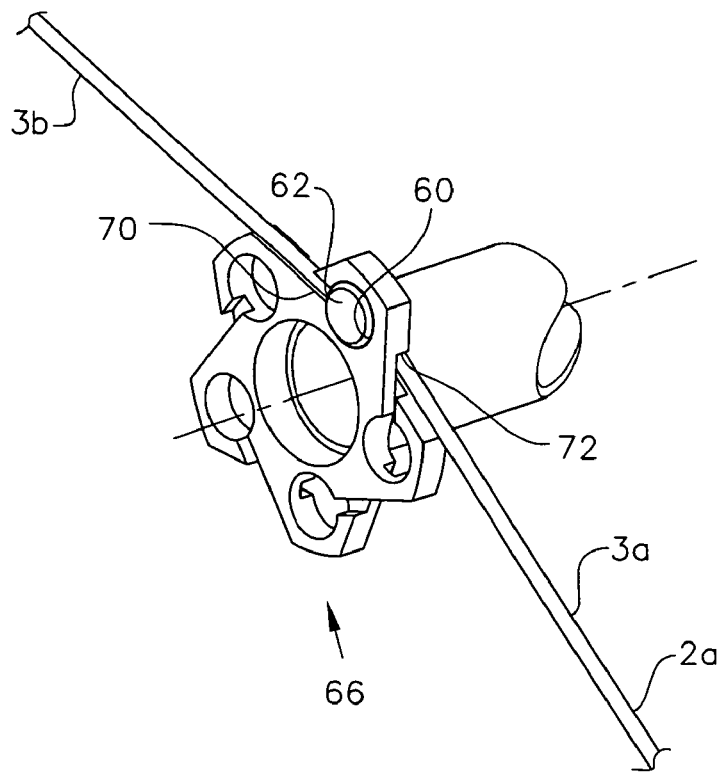
FIG. 6b is a partial perspective view of the embodiment of FIG. 6a, showing one spoke assembled to the hub flange.
Figure 6C:
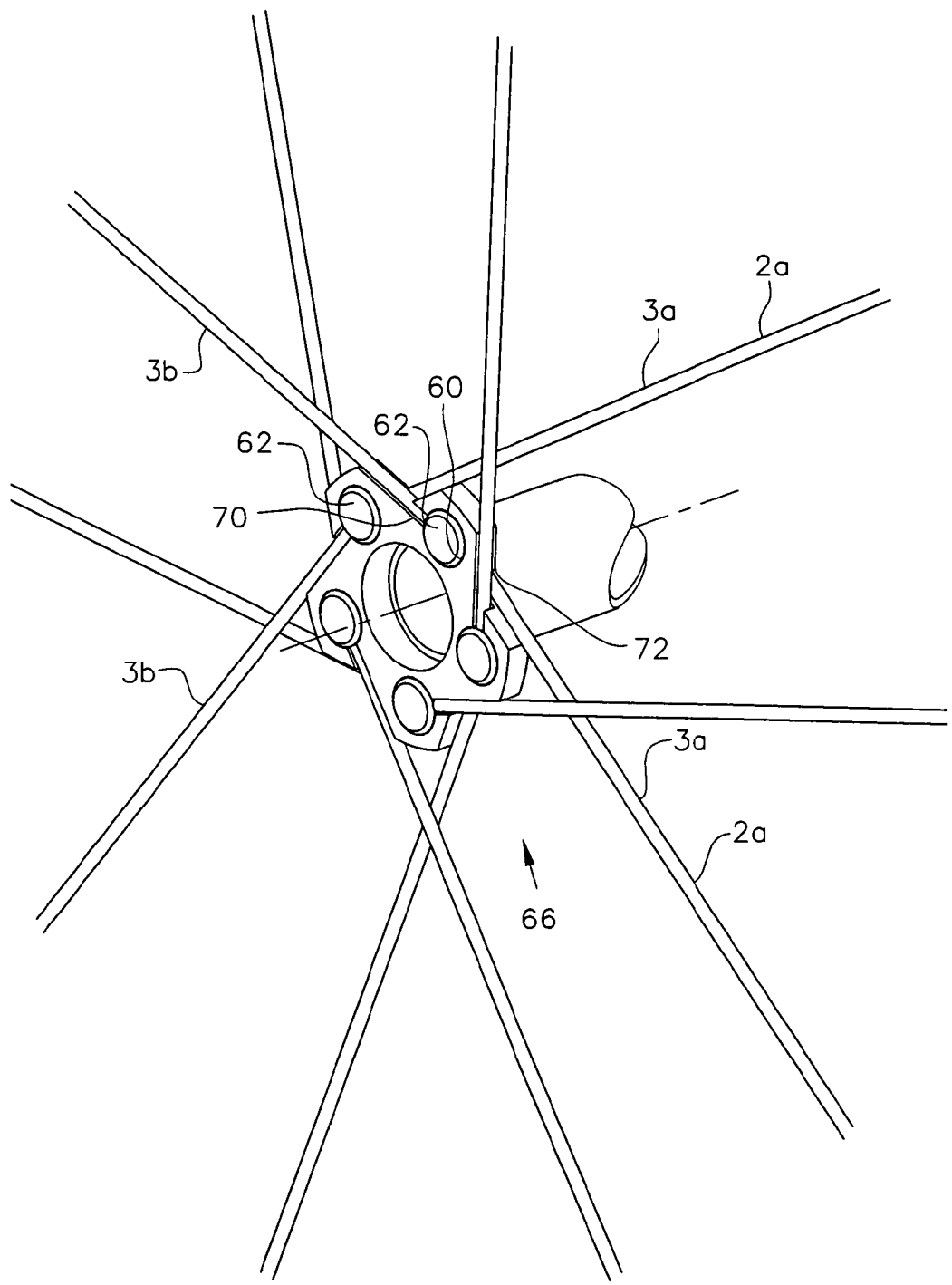
FIG. 6c is a partial perspective view of the embodiment of FIG. 6a, showing several spokes assembled to the hub flange.

Hub flange 66 is a radially extending flange with axial holes 60 to accept overmolded slug 62. In contrast to the circular hub flange 58 perimeter of FIGS. 5a–f, this hub flange 66 is non-circular, with cutouts 67 located in the region between the axial holes 60 to create a generally star-shaped hub flange 66 perimeter as shown. Hub flange 66 also includes clearance grooves 70 on its axially outboard surface to provide clearance for spoke span 3b and clearance grooves 72 on its axially inboard surface to provide clearance for spoke span 3a. Clearance grooves 70 and 72 allow for a reduced axial distance between spoke spans 3a and 3b. In other words, the offset 35 shown in FIG. 5a may now be reduced to be approximately equal to the cross-sectional thickness 36 of the spoke 2a. FIG. 6b shows spoke 2a assembled to hub flange 66 so that slug 62 is located inside axial hole 60 and spans 3a and 3b are located within their respective grooves 70 and 72. FIG. 6c shows the full complement of spokes 2a, including slugs 62 joined to the hub flange 66.

Figure 6D:
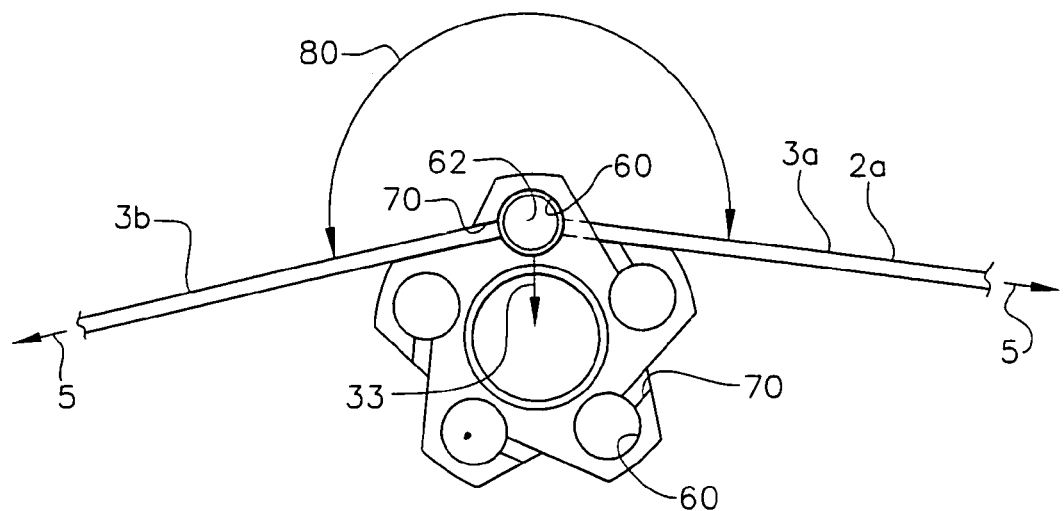
FIG. 6d is a partial axial plan view of the embodiment of FIG. 6a, showing one spoke assembled to the hub flange.
Figure 7:
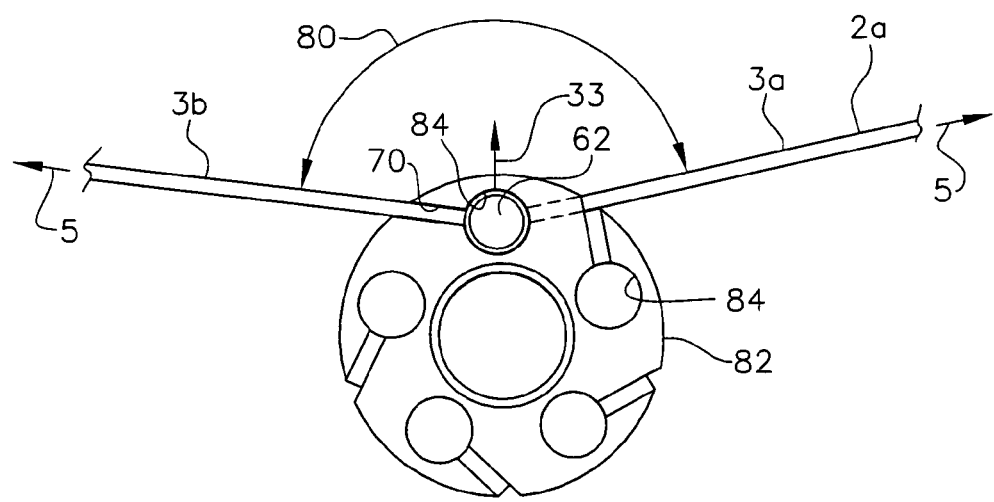
FIG. 7 is a partial axial plan view of an embodiment of the present invention, showing one spoke assembled to the hub flange.

FIG. 6d is a plan view corresponding to FIG. 6b, illustrating angle 80 between spoke spans 3a and 3b of spoke 2a as measured radially outboard of the hub flange 66. In this figure, the angle 80 is greater than 180 degrees so that the resultant force 33 due to spoke tension force 5 acts in a radially inward direction. In comparison, FIG. 7 describes an embodiment with an arrangement similar to FIG. 6d, however FIG. 7 shows the corresponding angle 80 between spans 3a and 3b as being less than 180 degrees. In this case, the resultant force 33 due to spoke tension force 5 acts in a radially outward direction as shown. With such a radially outward resultant force 33, the hub flange must include geometry to retain the spoke 2a and resist this outward resultant force. For this reason, a hub flange 82, with a closed cavity 84, is desirable for the embodiment of FIG. 7. Of course, if angle 80 were designed to be 180 degrees, the radial resultant force 33 would be zero.

Figure 8A:
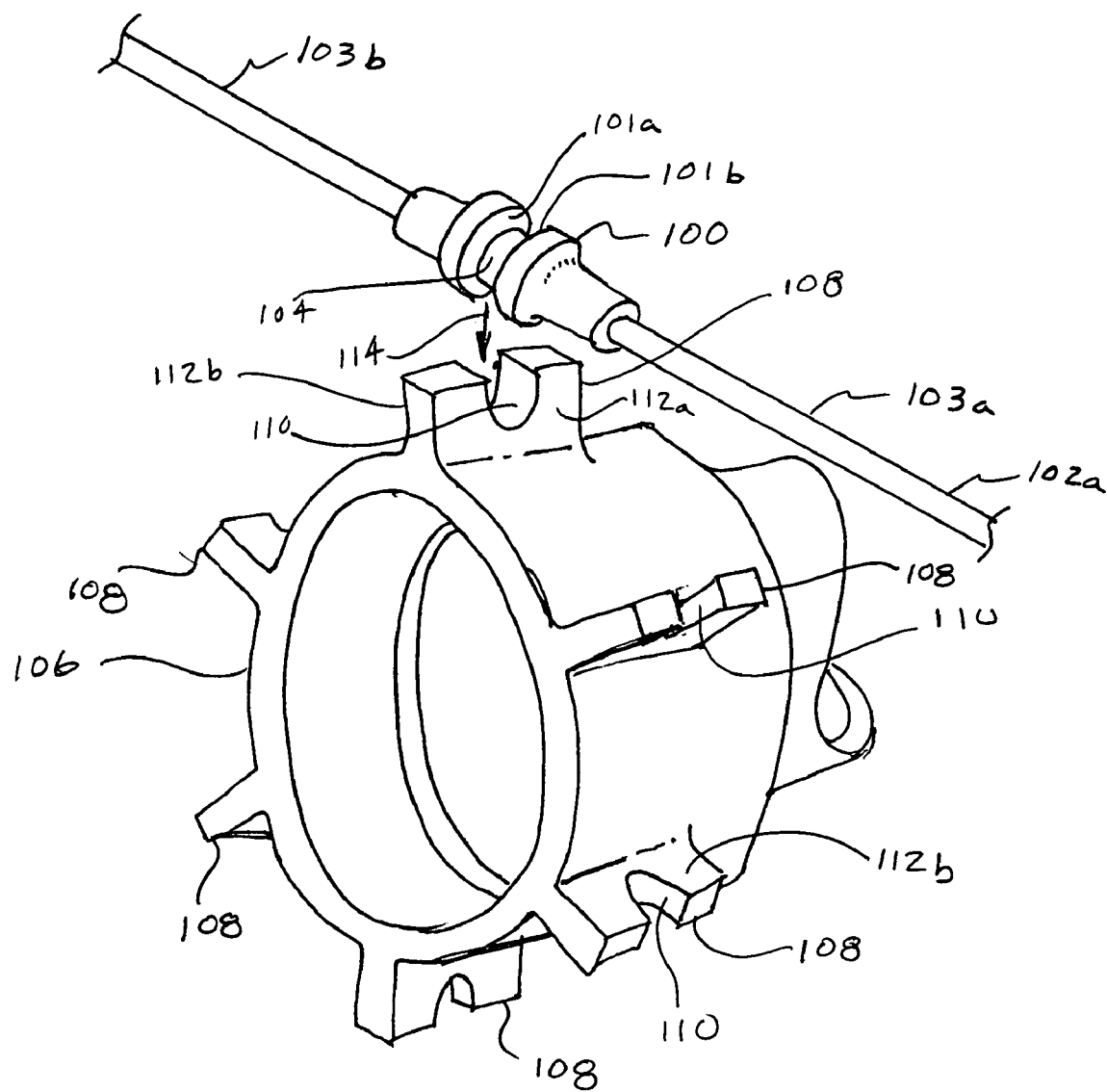
FIG. 8a is a partial axial plan view of an embodiment of the present invention, showing the spoke and hub flange prior to their assembly.

FIG. 8a provides a schematic description of yet another embodiment of the present invention. Spoke 102a is a duplex spoke with spans 103a and 103b. Enlarged portion 100 of spoke 102a includes two opposed engagement surfaces 101a and 101b with necked portion 104 therebetween. The enlarged portion 100 may be formed as an overmolded slug, where the geometry of the enlarged portion 100 is created in a casting process as previously described in FIGS. 4a–f. Alternatively, the material of the spoke 102a itself may be deformed by cold-heading or other means to create the desired geometry of the enlarged portion 100. The spoke 102a is shown here to be a generally straight spoke, without the offset kink as described in previous embodiments and without an axial offset between spans 103a and 103b. Crossover of spoke spans 103a and 103b of the completed wheel may still be accomplished, if desired, by flexing the spans to cross past each other. Hub flange 106 includes tabs 108, with each tab including notch 110 and a pair of opposed engagement faces 112a and 112b. Spoke 102a is assembled to hub flange 106 in a radial direction 114 such that necked portion 104 is nested in notch 110 with engagement surface 101a contacting engagement face 112b and engagement surface 101b contacting engagement face 112a. Thus it may be seen that a complete wheel structure may be produced in the manner previously described, with positive engagement between the spoke 102a and the hub flange 106.

Figure 8B:
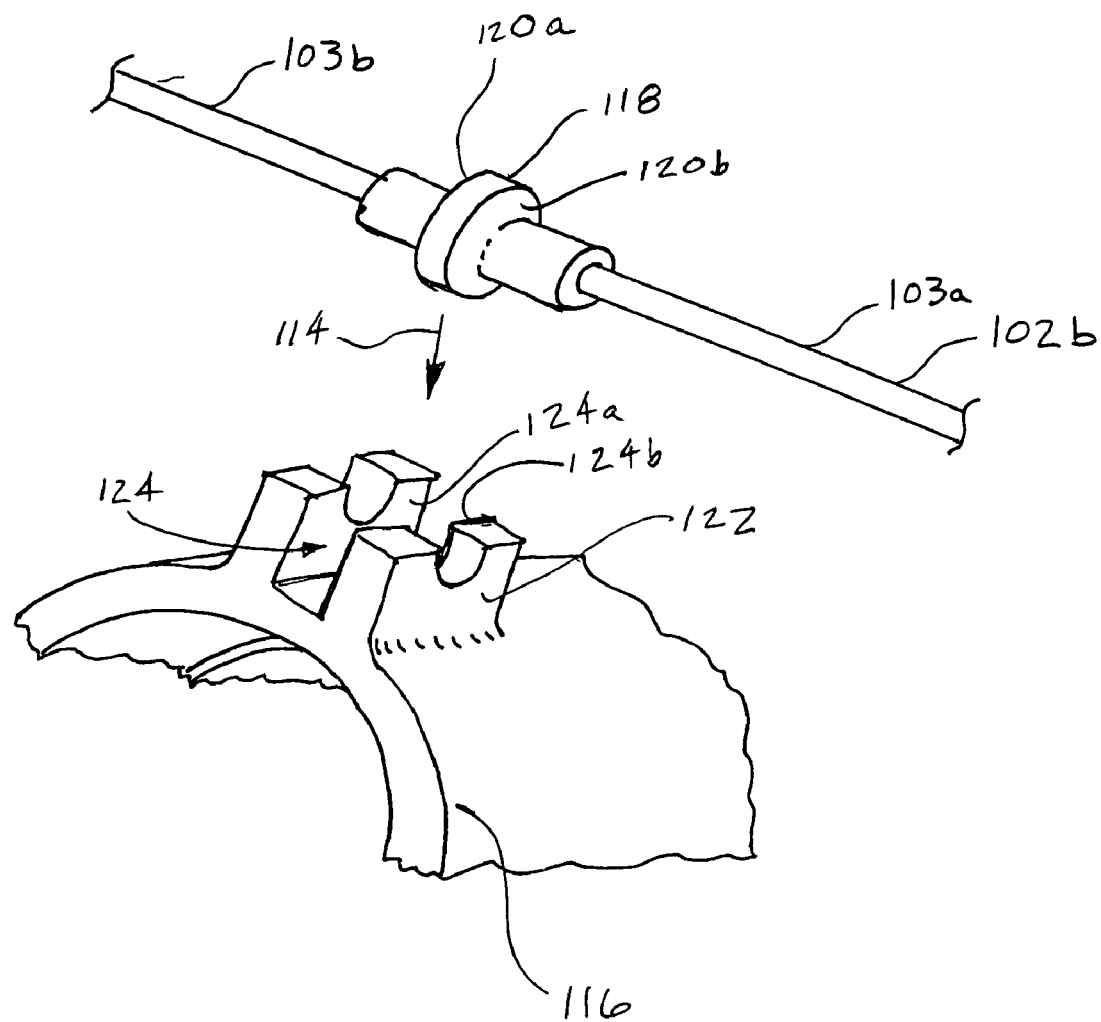
FIG. 8b is a partial axial plan view of an embodiment of the present invention, showing the spoke and hub flange prior to their assembly.

FIG. 8b describes an embodiment similar to the embodiment described in FIG. 8a, however in this case, the engagement geometry is somewhat reversed. Spoke 102b is a duplex spoke including spans 103a and 103b. Enlarged portion 118 of spoke 102b includes two external-facing engagement surfaces 120a and 120b. Hub flange 116 includes tabs 122, each including axial groove 124 to create opposed inward-facing engagement faces 124a and 124b. Spoke 102b is assembled to hub flange 116 in a radial direction 114 such that engagement surface 120a contacts engagement face 124a and engagement surface 120b contacts engagement face 124b.

Figure 9A:
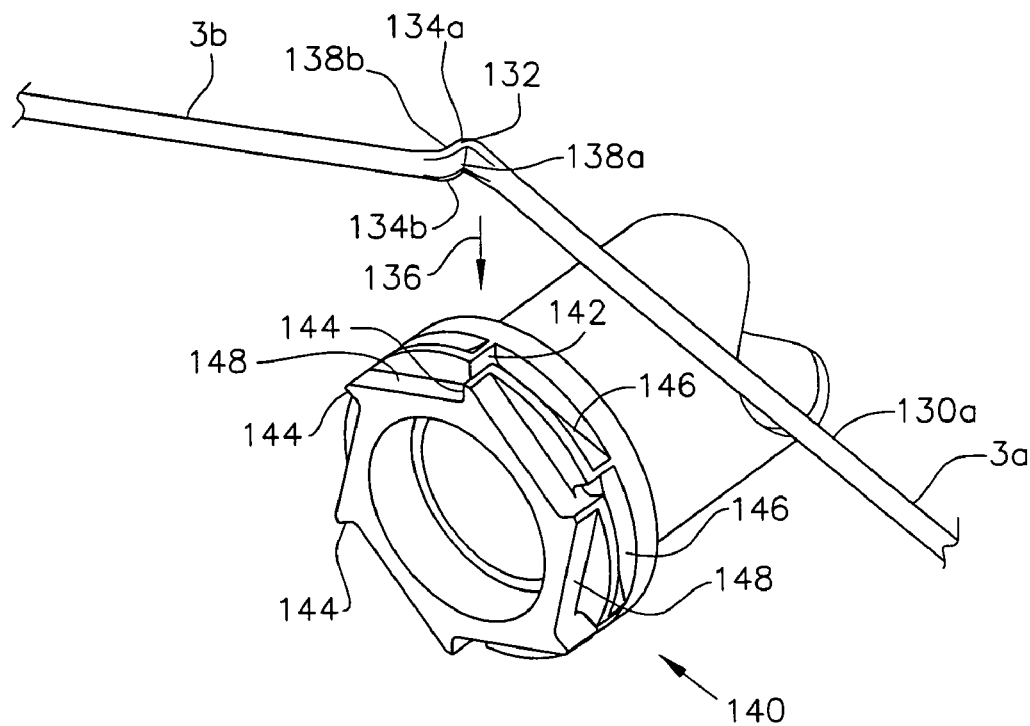
FIG. 9a is a partial perspective view of an embodiment of the present invention showing the spoke and hub flange prior to their assembly.
Figure 9B:
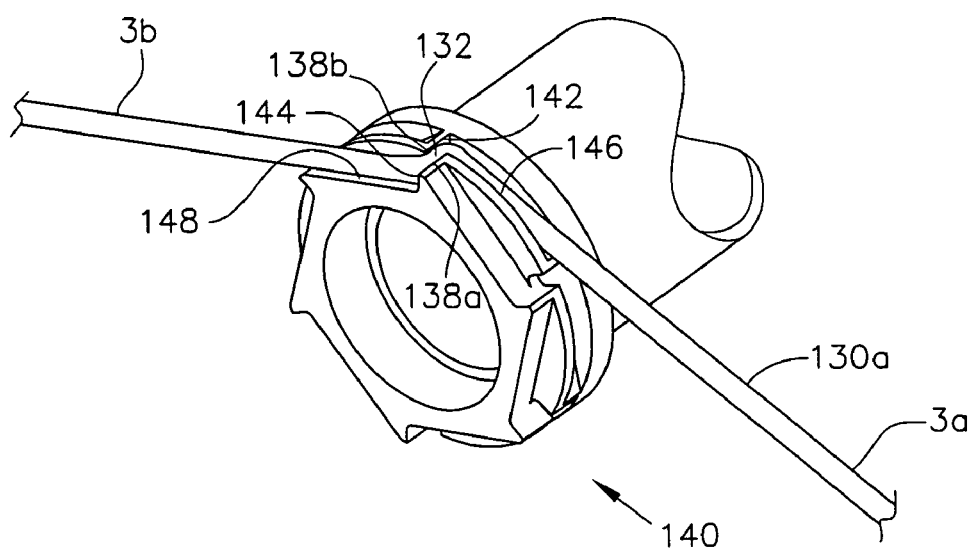
FIG. 9b is a partial perspective view of the embodiment of FIG. 9a, showing one spoke assembled to the hub flange.

FIGS. 9a–b describe an embodiment similar to FIGS. 3a–g. However, the spoke 130a of FIGS. 9a–b is flattened at its offset kink 132 to create a deformed cross section in the region where it is engaged to the hub flange 140. This deformation serves to create sharper bends in bent regions 134a and 134b and much more well-defined engagement surfaces 138a and 138b as compared to engagement surfaces 18a and 18b of FIG. 3a. FIG. 9a shows the spoke 130a prior to its assembly with the hub flange 140 and FIG. 9b shows spoke 130a assembled, in direction 136, to the hub flange 140. Hub flange 140 includes engagement face 142 to engage engagement surface 138a and engagement face 144 to engage engagement surface 138b to provide tangential blocking engagement between spoke 130a and hub flange 140. As compared with the embodiment of FIGS. 3a–g, engagement surfaces 138a and 138b are aligned to extend axially and have a larger surface area of engagement with mating engagement faces 142 and 144 for a more positive engagement between the spoke 130a and the hub flange 140. Hub flange 140 also includes clockwise tangential recess 146 to accept spoke span 3b and counterclockwise tangential recess 148 to accept spoke span 3a.

Figure 10A:
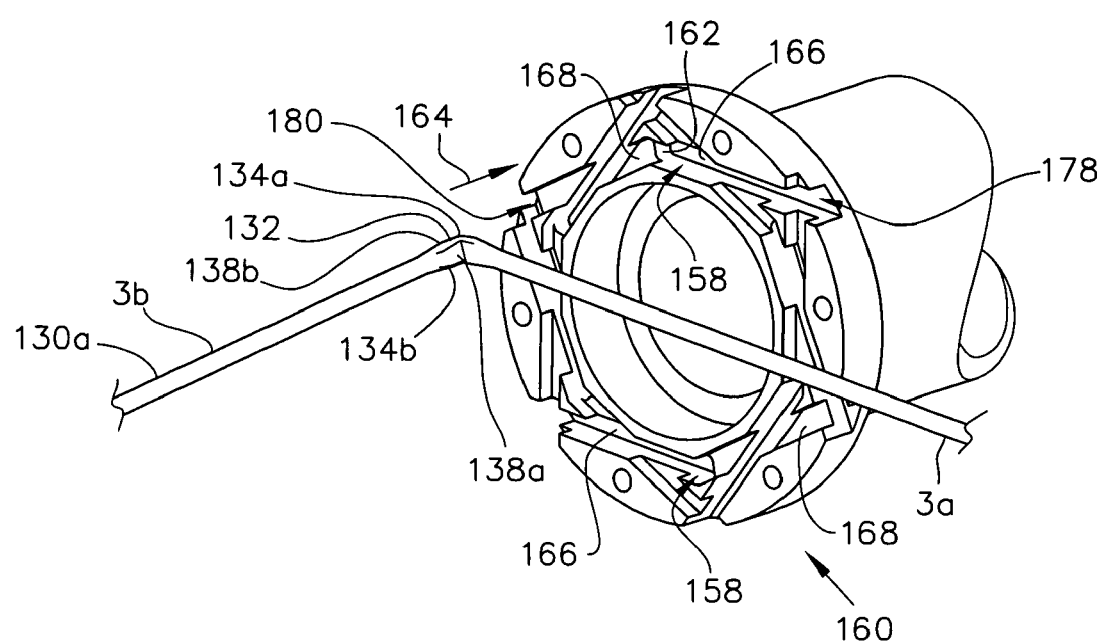
FIG. 10a is a partial perspective view of an embodiment of the present invention showing the spoke and hub flange prior to their assembly.
Figure 10B:
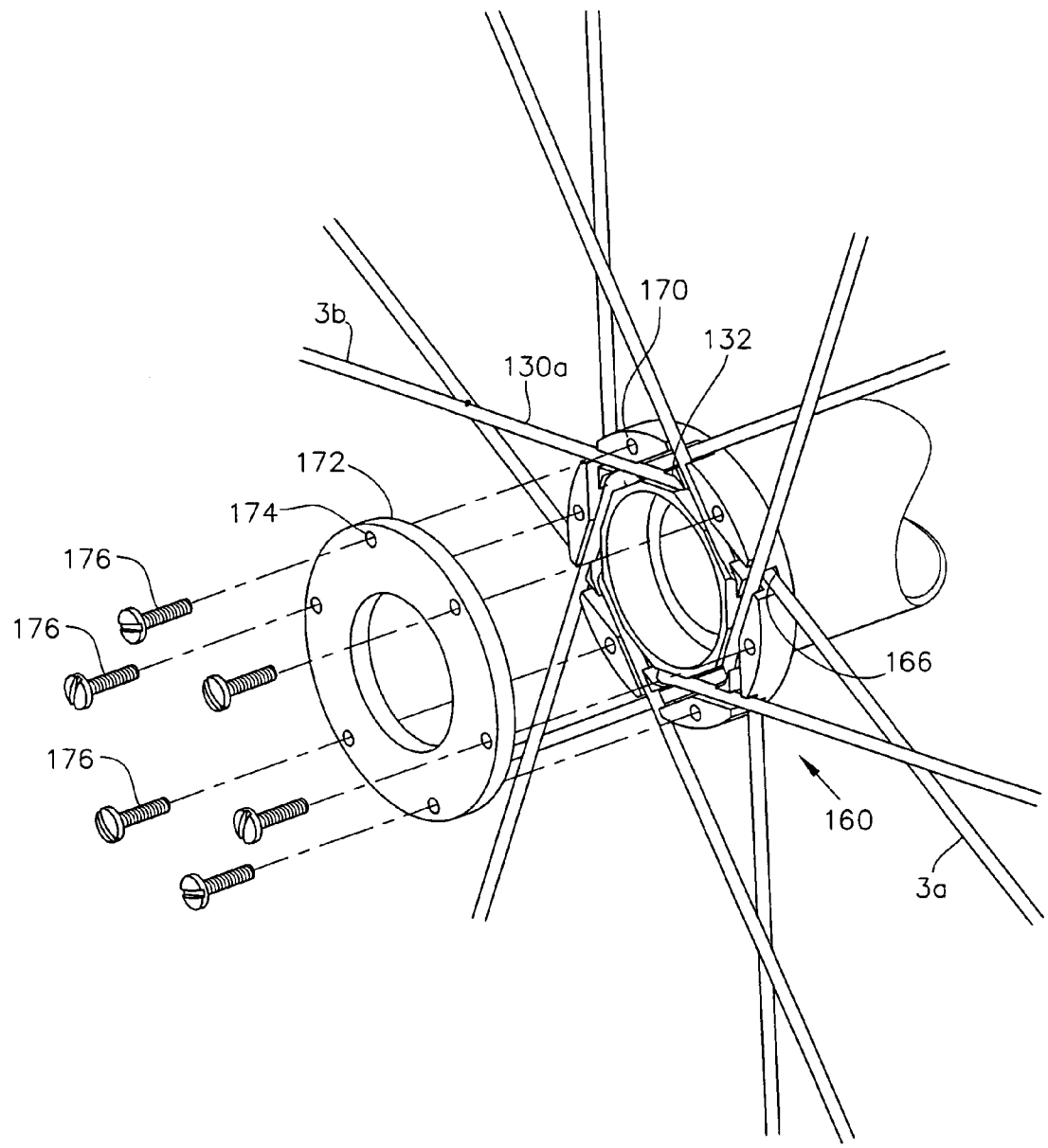
FIG. 10b is a partial perspective view of the embodiment of FIG. 10a, showing several spokes assembled to the hub flange, with the cover and screws shown in exploded view.

FIG. 10a and FIG. 10b describe yet another embodiment where the duplex spoke 130a is assembled to the hub flange 160 in a generally axial direction. Spoke 130a in FIG. 10a is shown to be identical to spoke 130a of the embodiment of FIGS. 9a–b, including spans 3a and 3b, offset kink 132, bent regions 134a and 134b and engagement surfaces 138a and 138b. Hub flange 160 includes a series of axial-facing open cavities 158 that are comprised of clockwise tangential recesses 166 and counter-clockwise tangential recesses 168 with an axial step therebetween to create engagement face 162. Cavity 158 is an open cavity with an axially-facing open sidewall surface and two open ends 178 and 180, where span 3a extends through open end 178 and span 3b extends through open end 180. It may also be seen that clockwise tangential recesses 166 may intersect with counter-clockwise tangential recesses 168 of adjacent cavities 158.

As shown in FIG. 10b, spoke 130a is assembled to cavity 158 in a generally axial direction 164 so that span 3b is nested in counter-clockwise tangential recess 168 and span 3a is nested in that clockwise tangential recess 166. Engagement surface 138b of spoke 130a is now also engaged with engagement face 162 of the cavity 158, creating a tangentially blocking engagement between the hub flange 160 and the spoke 130a for relative slippage control in the clockwise direction of rotation. As shown in FIG. 10b, a series of 6 spokes 130a are engaged to the hub flange 160, with their spans 3a crossing behind the spans 3b of their neighboring spokes 130a. With the full complement of spokes 130a assembled to hub flange 160, cover 172 is assembled and locked to the hub flange 160 via screws 176. Screws 176 pass through clearance holes 174 in cover 172 and thread into tapped holes 170 of hub flange 160. With screws threadably tightened, cover 172 serves as an auxiliary member to trap and clamp the spokes 13a in their cavities 158. Cover also includes extending surfaces (not visible) to engage engagement surfaces 138a of spokes 130a to create a tangentially blocking engagement between the hub flange 160 and the spokes 130a for relative slippage control in the counter-clockwise direction of rotation.

While my above description contains many specificities, these should not be construed as limitations on the scope of the invention, but rather as exemplifications of embodiments thereof. For example:

The above description is particularly focused on bicycle wheel applications where the spokes are pre-tensioned, however it is envisioned that the present invention may be applied to a wide range of vehicle wheels or machine elements such as rollers. It is also envisioned that the present invention may be applied to wheels whose spokes are not pre-tensioned.

The spokes of the present invention are shown to be assembled to the hub flange in a generally radial or a generally axial direction. It is also envisioned that the spokes may be assembled to the hub flange in a generally tangential direction as well. As a further alternative, it is also envisioned that the spokes may be assembled to the hub flange that is in a direction that is some combination of the axial, radial and tangential directions.

The spokes of the present invention are shown to be directly assembled to the hub flange, however, it is envisioned that the hub flange and/or the spoke may include intermediary components that may be construed as extensions of the respective hub flange and/or spoke. In such a case, the spoke is engaged to the intermediary component and the intermediary component is connected to the hub flange.

Further, any manner of auxiliary components may be utilized to engage, retain, clamp or otherwise augment the connection between the spoke(s) and the hub flange.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A wheel, comprising:
   a peripheral wheel rim;
   a central hub with a hub flange;
   a plurality of spokes extending between the rim and hub, wherein said spokes have a first portion connected to said rim and a second portion opposed to said first portion;
   wherein at least one of said spokes is a duplex spoke, including two structural spans, each extending between said rim and said hub with a common portion connected to said hub flange;
   wherein said at least one duplex spoke includes engagement means having a non-uniform region of variable cross section geometry at said common portion to engage said hub flange and said hub flange includes engagement means to engage said duplex spoke engagement means;
   and wherein said hub flange engagement means includes means to prevent axial and tangential movement between the hub flange and the duplex spoke engagement means.

2. A wheel according to claim 1, wherein said wheel is a tension-spoke wheel, including spoke pre-tension.

3. A wheel according to claim 1, wherein said duplex spoke is assembled to said hub flange in a generally radial direction for connection between said duplex spoke and said hub flange.

4. A wheel according to claim 2, wherein said hub flange includes a reinforcement element, wherein said reinforcement element provides reinforcement to the hub flange to resist spoke tension loads inuced by said duplex spokes.

5. A wheel according to claim 1, wherein said two structural spans of said duplex spokes are axially offset from each other.

6. A wheel according to claim 5, wherein the distance of said axial offset is generally equal to the axial cross-sectional thickness of said duplex spoke in the region of at least one of said structural spans.

7. A wheel according to claim 5, wherein the distance of said axial offset is greater than the axial cross-sectional thickness of said duplex spoke in the region of at least one of said structural spans.

8. A wheel according to claim 5, wherein said duplex spokes includes a clockwise radiating span and a counter-clockwise radiating span and wherein the clockwise radiating span of a first of said duplex spokes crosses past the counterclockwise span of a second of said duplex spokes.

9. A wheel according to claim 1, wherein said engagement means of said duplex spoke has matched surface-to-surface contact with said engagement means of said hub flange.

10. A wheel according to claim 1, wherein said duplex spoke includes a kink to create the engagement means of said duplex spoke.

11. A wheel according to claim 1, including an angle between said first and second structural spans wherein said angle, as measured radially outboard of said hub flange, is greater than or equal to 180 degrees.

12. A wheel according to claim 1, including an angle between said first and second structural spans wherein said angle, as measured radially outboard of said hub flange, is less than 180 degrees.

13. A wheel according to claim 1, wherein said duplex spoke includes at least two of said duplex spoke engagement means and wherein said hub flange includes at least two of said hub flange engagement means and wherein a first of said engagement means of said duplex spoke is engaged to a first of said engagement means of said hub flange to prevent axial and tangential movement between said duplex spoke and said hub flange in one tangential direction and wherein a second of said engagement means of said duplex spoke is engaged to a second of said engagement means of said hub flange to prevent axial and tangential movement between said duplex spoke and said hub flange in the opposite tangential direction.

14. A wheel according to claim 10, wherein said at least two engagement means of said hub flange are axially staggered with respect to each other.

15. A wheel according to claim 10, wherein at least two of said engagement means of said hub flange are arranged to create a wedging engagement with at least two of said engagement means of said duplex spoke.

16. A wheel according to claim 12, including spoke pre-tension, wherein said spoke pre-tension serves to press said at least two engagement means of said duplex spoke against said at least two engagement means of said hub flange to augment said wedging engagement.

17. A wheel according to claim 1, wherein said hub flange includes an open cavity for engagement with said duplex spoke.

18. A wheel according to claim 14, wherein said open cavity includes two open ends, with said first of said structural spans extending through a first of said open ends and a second of said structural spans extending through a second of said open ends.

19. A wheel according to claim 14, wherein said open cavity includes a generally radially extending spoke bracing surface, wherein said duplex spoke contacts and is engaged to said spoke bracing surface.

20. A wheel according to claim 16, including at least two of said spoke bracing surfaces, wherein a first of said structural spans of said duplex spoke contacts a first of said spoke bracing surfaces and wherein a second of said structural spans of said duplex spoke contacts a second of said spoke bracing surfaces.

21. A wheel according to claim 14, wherein said open cavity includes at least two recesses, wherein a first of said recesses is with a first structural span of said duplex spoke and wherein a second of said recesses is mated with a second structural span of said duplex spoke.

22. A wheel according to claim 1, wherein said hub flange is made of polymeric material.

23. A wheel according to claim 19, wherein said polymeric material includes reinforcement fibers.

24. A wheel according to claim 1, wherein said duplex spoke includes a continuous structural element, wherein said continuous structural element includes said two structural spans and includes at least a portion of said common portion.

25. A wheel according to claim 21, wherein said continuous structural element is made of metallic material.

26. A wheel according to claim 21, wherein said continuous structural element includes high strength reinforcement fibers.

27. A wheel according to claim 23, wherein said high strength fibers are impregnated within a polymer matrix.

28. A wheel according to claim 24, wherein said polymer matrix is a thermoplastic polymer matrix.

29. A wheel according to claim 23, wherein said high strength fibers are continuous fibers that extend through said common portion.

30. A wheel according to claim 1, wherein said spoke engagement means has a region of variable cross section geometry, wherein said variable cross section geometry provides an overlying engagement with the hub flange.

31. A wheel according to claim 27, wherein said region of variable cross-section geometry is an integral portion of said duplex spoke.

32. A wheel according to claim 27, wherein said variable cross section geometry includes a projecting portion extending outwardly from said spoke that engages a projecting portion extending from said hub flange.

33. A wheel according to claim 1, wherein said wheel includes a plurality of said duplex spokes.

34. A wheel according to claim 1, wherein said hub flange engagement means for preventing axial and tangential movement comprises duplex spoke engagement means operative to at least one of (1) provide bracing against spoke tension and (2) to transmit torque between the hub flange and said rim.

35. A wheel according to claim 4, wherein said central hub includes an axle and wherein said reinforcement element is a cylindrical element surrounding said axle.

36. A wheel according to claim 1, wherein said two structural spans of said duplex spoke are generally aligned without an offset kink.

37. A wheel according to claim 1, wherein said duplex spoke engagement means is deformable to adjust the fitment between said duplex spoke engagement means and said hub flange engagement means.

38. A wheel according to claim 1, wherein said at least one duplex spoke includes engagement means to directly engage said hub flange and said hub flange includes engagement means to directly engage said duplex spoke engagement means.

39. A wheel, comprising:
a peripheral wheel rim;
a central hub with a hub flange;
a plurality of spokes extending between the rim and hub, wherein said spokes have a first portion connected to said rim and a second portion opposed to said first portion;
wherein at least one of said spokes is a duplex spoke, including two structural spans, each extending between said rim and said hub with a common portion connected to said hub flange;
wherein said at least one duplex spoke includes engagement means to engage said hub flange and said hub flange includes engagement means to engage said duplex spoke engagement means;
wherein said hub flange engagement means includes means to prevent axial and tangential movement between the hub flange and the duplex spoke engagement means;
and wherein said duplex spoke includes an overmolded slug and wherein said engagement means of said duplex spoke is located on said overmolded slug.

40. A wheel according to claim 33, wherein said two structural spans of said duplex spoke are axially offset from each other.

41. A wheel according to claim 33, wherein said engagement means on said overmolded slug is generally perpendicular to at least one of said structural spans of said duplex spoke.

42. A wheel according to claim 33, wherein said engagement means on said overmolded slug extends in a generally axial direction.

43. A wheel according to claim 33, wherein said engagement means on said overmolded slug has matched surface-to-surface contact with said engagement means on said hub flange.

44. A wheel according to claim 16, wherein said overmolded slug constitutes a region of enlarged cross-section geometry as compared to the cross section geometry of the structural span of said duplex spoke.

45. A wheel, comprising:
a peripheral wheel rim;
a central hub with a hub flange;
a plurality of spokes extending between the rim and hub, wherein said spokes have a first portion connected to said rim and a second portion opposed to said first portion; wherein at least one of said spokes is a duplex spoke, including two structural spans, each extending between said rim and said hub with a common portion connected to said hub flange;
wherein said at least one duplex spoke includes engagement means to engage said hub flange and said hub flange includes engagement means to engage said duplex spoke engagement means;
wherein said hub flange engagement means includes means to prevent axial and tangential movement between the hub flange and the duplex spoke engagement means;
wherein said hub flange engagement means includes means to prevent axial and tangential movement between the hub flange and the duplex spoke engagement means;
wherein said hub flange includes an open cavity for engagement with said duplex spoke;
wherein said open cavity includes at least two recesses, wherein a first of said recesses is engaged with a first structural span of said duplex spoke and wherein a second of said recesses is engaged with a second structural span of said duplex spoke;
and including an axially extending gap between said first recess and said second recess for passage of said duplex spoke.

46. A wheel, comprising:
a peripheral wheel rim;
a central hub with a hub flange;
a plurality of spokes extending between the rim and hub, wherein said spokes have a first portion connected to said rim and a second portion opposed to said first portion;
wherein at least one of said spokes is a duplex spoke, including two structural spans, each extending between said rim and said hub with a common portion connected to said hub flange;
wherein said at least one duplex spoke includes engagement means to engage said hub flange and said hub flange includes engagement means to engage said duplex spoke engagement means; wherein said hub flange engagement means includes to prevent axial and tangential movement between the hub flange and the duplex spoke engagement means;
wherein said spoke engagement means has a region of variable cross section geometry,
wherein said variable cross section geometry provides an overlying engagement with the hub flange;
wherein said variable cross section geometry includes a projecting portion extending outwardly from said spoke that engages a projecting portion extending outwardly from said hub flange;

and including a spoke extension affixed to said duplex spoke, wherein said spoke extension includes said projecting portion of said spoke.

47. A wheel comprising:

a peripheral wheel rim;

a central hub with a hub flange;

a plurality of spokes extending between the rim and hub, wherein said spokes have a first portion connected to said rim and a second portion opposed to said first portion; wherein at least one of said spokes is a duplex spoke, including two structural spans, each extending between said rim and hub with a common portion connected to said hub flange;

wherein said at least one duplex spoke includes engagement means to engage said hub flange and said hub flange includes engagement means to engage said duplex spoke engagement means, wherein said hub flange engagement means includes means to prevent axial and tangential movement between the hub flange and the duplex spoke engagement means; and including an auxiliary member, wherein the auxiliary member serves to at least one of retain, engage, and clamp said spoke to said hub flange.

48. A wheel, comprising:

a peripheral wheel rim;

a central hub with a hub flange;

a plurality of spokes extending between the rim and hub, wherein said spokes have a first portion connected to said rim and a second portion opposed to said first portion;

wherein at least one of said spokes is a duplex spoke, including two structural spans, each extending between said rim and said hub with a common portion connected to said hub flange;

wherein said at least one duplex spoke includes engagement means to engage said hub flange and said hub flange includes engagement means to engage said duplex spoke engagement means;

wherein said hub flange engagement means includes means to prevent axial and tangential movement between the hub flange and the duplex spoke engagement means;

and including an auxiliary member, wherein said spoke is engaged to said intermediary member and said intermediary member is connected to said hub flange.

* * * * *